(12) United States Patent
Phoha et al.

(10) Patent No.: US 7,792,770 B1
(45) Date of Patent: Sep. 7, 2010

(54) METHOD TO INDENTIFY ANOMALOUS DATA USING CASCADED K-MEANS CLUSTERING AND AN ID3 DECISION TREE

(75) Inventors: Vir V. Phoha, Ruston, LA (US); Kiran S. Balagani, Ruston, LA (US)

(73) Assignee: Louisiana Tech Research Foundation; a Division of Louisiana Tech University Foundation, Inc., Ruston, LA (US)

( * ) Notice: Subject to any disclaimer, the term of this patent is extended or adjusted under 35 U.S.C. 154(b) by 444 days.

(21) Appl. No.: 12/072,252

(22) Filed: Feb. 25, 2008

Related U.S. Application Data

(63) Continuation-in-part of application No. 11/844,834, filed on Aug. 24, 2007, now abandoned.

(51) Int. Cl.
*G06N 5/00* (2006.01)

(52) U.S. Cl. .......................................................... 706/45

(58) Field of Classification Search ............. 706/45–47, 706/52–53, 62
See application file for complete search history.

(56) References Cited

U.S. PATENT DOCUMENTS

| | | | |
|---|---|---|---|
| 5,278,901 A | 1/1994 | Shieh et al. | |
| 5,440,723 A | 8/1995 | Arnold et al. | |
| 5,539,659 A | 7/1996 | McKee et al. | |
| 5,557,742 A | 9/1996 | Smaha et al. | |
| 5,621,889 A | 4/1997 | Lermuzeaux et al. | |
| 5,931,946 A | 8/1999 | Terada et al. | |
| 5,974,237 A | 10/1999 | Shurmer et al. | |
| 6,321,338 B1 | 11/2001 | Porras et al. | |
| 6,405,318 B1 | 6/2002 | Rowland | |
| 6,704,874 B1 | 3/2004 | Porras et al. | |
| 6,742,124 B1 | 5/2004 | Kilpatrick et al. | |
| 6,889,218 B1 | 5/2005 | Nassehi | |
| 7,065,534 B2 | 6/2006 | Folting et al. | |
| 7,480,640 B1 * | 1/2009 | Elad et al. ..................... | 706/14 |

OTHER PUBLICATIONS

Yang et al., A Study on Retrospective and On-Line Event Detection, 1998, ACM, 1-58113-015-5, pp. 28-36.*

Murthy, Automatic Construction if Desicion aTrees from Data: A Multi-Disciplinary Survey, 1998, Data Mining and Knowledge Discovery, 2,pp. 345-389.*

(Continued)

*Primary Examiner*—David R Vincent
(74) *Attorney, Agent, or Firm*—Jones, Walker, Waechter, Poitevent, Carrere & Denegre, LLP

(57) ABSTRACT

The invention is a computer implemented technique for identifying anomalous data in a data set. The method uses cascaded k-Means clustering and the ID3 decision tree learning methods to characterize a training data set having data points with known characterization. The k-Means clustering method first partitions the training instances into k clusters using Euclidean distance similarity. On each training cluster, representing a density region of normal or anomaly instances, the invention builds an ID3 decision tree. The decision tree on each cluster refines the decision boundaries by learning the sub-groups within the cluster. A test data point is then subjected to the clustering and decision trees constructed form the training instances. To obtain a final decision on classification, the decisions of the k-Means and ID3 methods are combined using rules: (1) the Nearest-neighbor rule, and (2) the Nearest-consensus rule.

13 Claims, 13 Drawing Sheets

Extraction of k-Means and ID3 decision tree scores from $f = 3$ candidate clusters for the test instance $Z_i$.

OTHER PUBLICATIONS

T. Lane and C.E. Brodley, "Temporal Sequence Learning and Data Reduction for Anomaly Detection," ACM Transactions on Information and System Security (TISSEC), vol. 2, No. 3, pp. 295-331, Aug. 1999.

W. Lee and S.J. Stolfo, "A Framework for Constructing Features and Models for Intrusion Detection Systems." ACM Transactions on Information and System Security (TISSEC), vol. 3, No. 4, pp. 227-261, Nov. 2000.

G. Hazel, "Multivariate Gaussian MRF for Multispectral Scene Segmentation and Anomaly Detection," IEEE Transactions in Geoscience and Remote Sensing, vol. 38, No. 3, pp. 119-1211, May 2000.

V. Alarcon and J.A. Barria, "Anomaly Detection in Communication Networks Using Wavelets," IEE Proceedings—Communication, vol. 148, No. 6, pp. 355-362, Dec. 2001.

N. Ye, X. Li, Q. Chen, S.M. Emran, and M. Xu, "Probabilistic Techniques for Intrusion Detection Based on Computer Audit Data," IEEE Transactions on Systems, Man, and Cybernetics, vol. 31, No. 4, pp. 266-274, Jul. 2001.

N. Ye, S.M. Emran, Q. Chen and S. Vilbert, "Multivariate Statistical Analysis of Audit Trails for Host-Based Intrusion Detection," IEEE Transactions on Computers, vol. 51. No. 7, pp. 810-820, Jul. 2002.

M. Thottan and C. Ji, "Anomaly Detection in IP Networks," IEEE Transactions on Signal Processing, vol. 51, No. 8, pp. 2191-2203, Aug. 2003.

C. Kruegel and G. Vigna, "Anomaly Detection of Web-Based Attacks," Proceedings of the 10th ACM Conference on Computer and Communications Security, pp. 251-261, Washington D.C. 2003.

N. Ye and Q. Chen, "Computer Intrusion Detection through EWMA for Auto-Correlated and Uncorrelated Data," IEEE Transactions on Reliability, vol. 52, No. 1, pp. 73-82, Mar. 2003.

F. Esponda, S. Forrest, and P. Helman, "A Formal Framework for Positive and Negative Detection Schemes," IEEE Transactions on Systems, Man and Cybernetics Part B: Cybernetics, vol. 34, No. 1, pp. 357-373, Feb. 2004.

N. Ye, Q. Chen, and C. Borror, "EWMA Forecast of Normal System Activity for Computer Intrusion Detection," IEEE Transactions on Reliability, vol. 53, No. 4, pp. 557-566, Dec. 2004.

N. Ye, Y. Zhang, and C. M. Borror, "Robustness of the Markov-Chain Model for Cyber-Attack Detection," IEEE Transactions on Reliability, vol. 53, No. 1, pp. 116-123, Mar. 2004.

A. Ray, "Symbolic Dynamic Analysis of Complex Systems for Anomaly Detection," Signal Processing, vol. 84, No. 7, pp. 1115-1130, Jul. 2004.

R. Kemmerer and G. Vigna, "Hi-DRA: Intrusion Detection for Internet Security," IEEE Proceedings, vol. 93, No. 10, pp. 1848-1857, Oct. 2005.

S. Sarasamma, Q. Zhu, and J. Huff, "Hierarchical Kohonen Net for Anomaly Detection in Network Security," IEEE Transactions on Systems, Man and Cybernetics—Part B, vol. 35, No. 2, pp. 302-311, Apr. 2005.

S, Chin, A. Ray and V. Rajagopalan, "Symbolic Time Series Analysis for Anomaly Detection: A Comparative Evaluation," Signal Processing, vol. 85, No. 9, pp. 1859-1868, Sep. 2005.

B. Sun, F. Yu, K. Wu, Y. Xiao and V. C. M. Leung, "Enhancing Security Using Mobility-Based Anomaly Detection in Cellular Mobile Networks," IEEE Transactions on Vehicular Technology, vol. 55, No. 3, pp. 1385-1396, May 2006.

M. Mandjes, I Saniee, and S. Stolyar, "Load Characterization and Load Anomaly Detection for Voice over IP Traffic," IEEE Transactions on Neural Networks, vol. 16, No. 5, pp. 1019-1025, Sep. 2005.

S.T. Sarasamma and Q.A. Zhu, "Min-Max Hyperellipsoidal Clustering for Anomaly Detection in Network Security," IEEE Transactions on Systems, Man, and Cybernetics—Part B, vol. 36, No. 4, pp. 887-901, Aug. 2006.

A. Khatkhate, A. Ray, E Keller, S. Gupta, and S. Chin, "Symbolic Time Series Analysis for Anomaly Detection in Mechanical Systems," IEEE/ASME Transactions on Mechatronics, vol. 11, No. 4, pp. 439-447, Aug. 2006.

X. Song, M. Wu, C. Jermaine and S. Ranka, "Conditional Anomaly Detection," IEEE Transactions on Knowledge and Data Engineering, vol. 19, No. 5, pp. 631-645, May 2007.

M. Qin, K. Hwang, M. Cai, and Y. Chen, "Hybrid Intrusion Detection With Weighted Signature Generation Over Anomalous Internet Episodes," IEEE Transactions on Dependable and Secure Computing, vol. 4, No. 1, pp. 41-55, Jan. 2007.

Z. Yu, J. J. P. Tsai and T. Weigert, "Automatically Tuning Intrusion Detection System," IEEE Transactions on System, Man, Cybernetics—Part B, vol. 37, No. 2, pp. 373-384, Apr. 2007.

\* cited by examiner

Input: Test instances $Z_i$, $i = 1\ldots n$; $f$ value.

Output: Anomaly score matrix for $Z_i$, $i = 1\ldots n$.

Procedure Candidate_Selection {
    Step 1: For each test instance $Z_i$
        a. Compute Euclidean distance $D(Z_i, r_j)$, $j = 1\ldots k$, and find $f$ clusters closest to $Z_i$.
        b. Compute k-Means and ID3 decision tree scores for $f$ nearest (candidate) clusters.
    Step 2: Return Anomlay Score Matrix for $Z_i$.
} /* End Procedure */

Figure 1. Procedure for Candidate Selection.

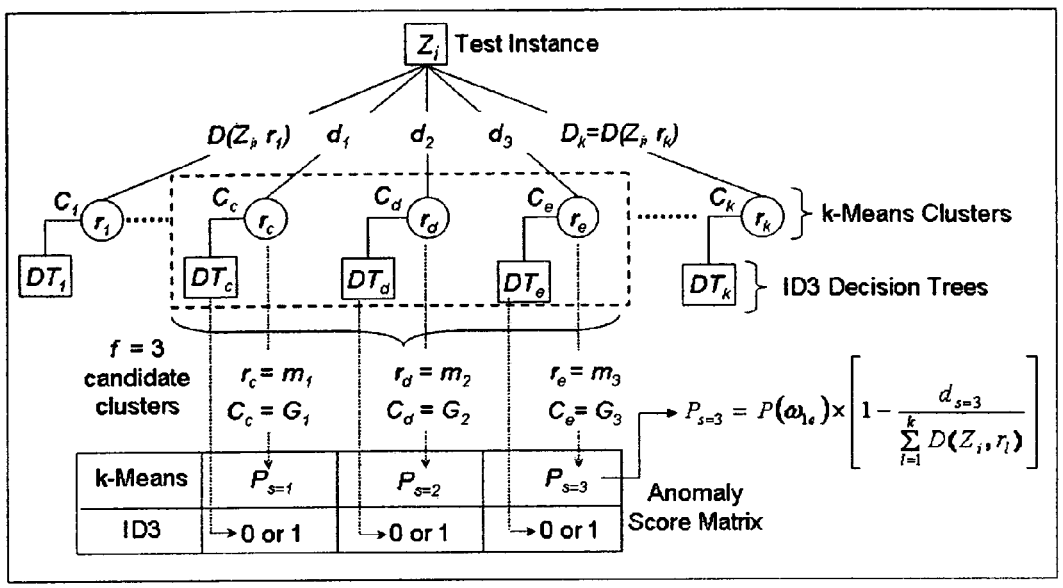
Figure 2. Extraction of k-Means and ID3 decision tree scores from $f = 3$ candidate clusters for the test instance $Z_i$.

|  | $G_1$ | $G_2$ | $G_3$ | ............ | $G_f$ |
|---|---|---|---|---|---|
| k-Means | 1 | 1 | 0 | ............ | 1 |
| ID3 | 0 | 1 | 0 | ............ | 0 |

↑
Consensus

Figure 3. An example anomaly score matrix for a test instance $Z_i$. The anomaly scores of the k-Means method are hardened using the Threshold rule.

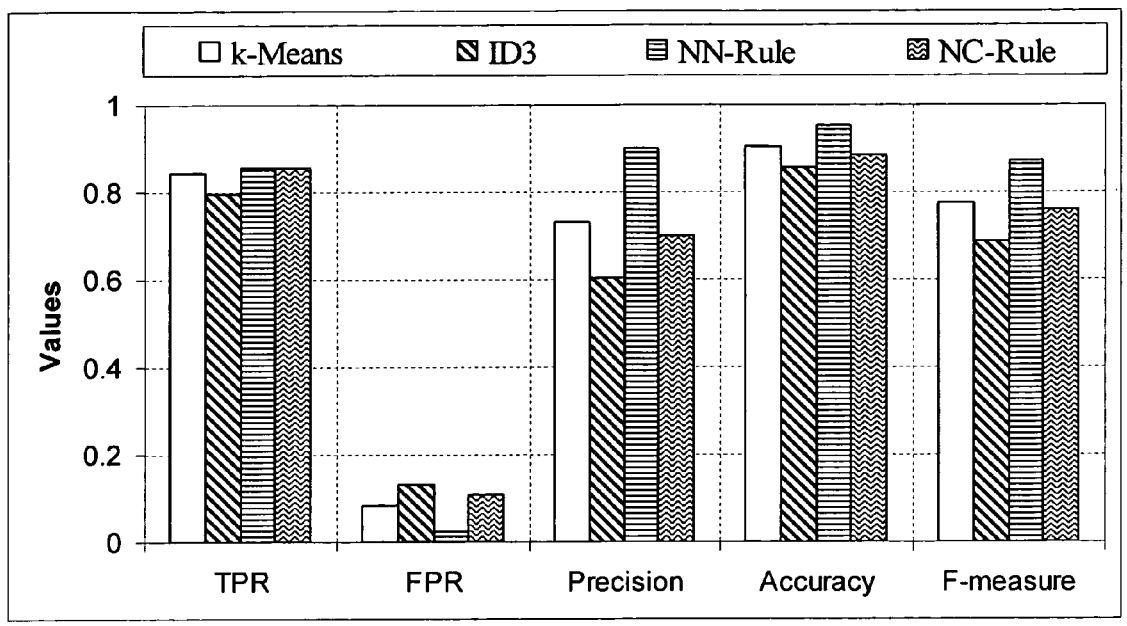
Figure 4. Performance of the k-Means, the ID3 decision tree, and the K-Means+ID3 method with Nearest-neighbor (NN-Rule) and Nearest-consensus (NC-Rule) combination rules over the NAD-1998 test dataset.

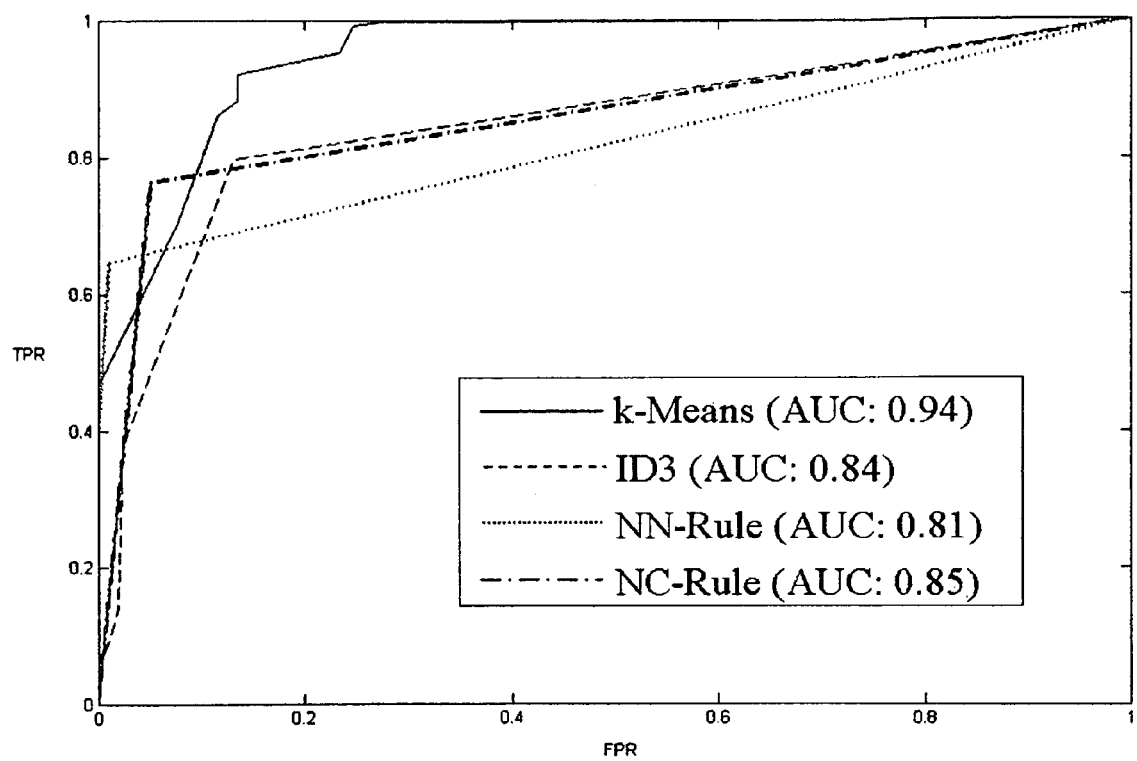
Figure 5. ROC Curves and AUCs of k-Means, ID3, and K-Means+ID3 with NN-Rule and NC-Rule over the NAD-1998 test dataset.

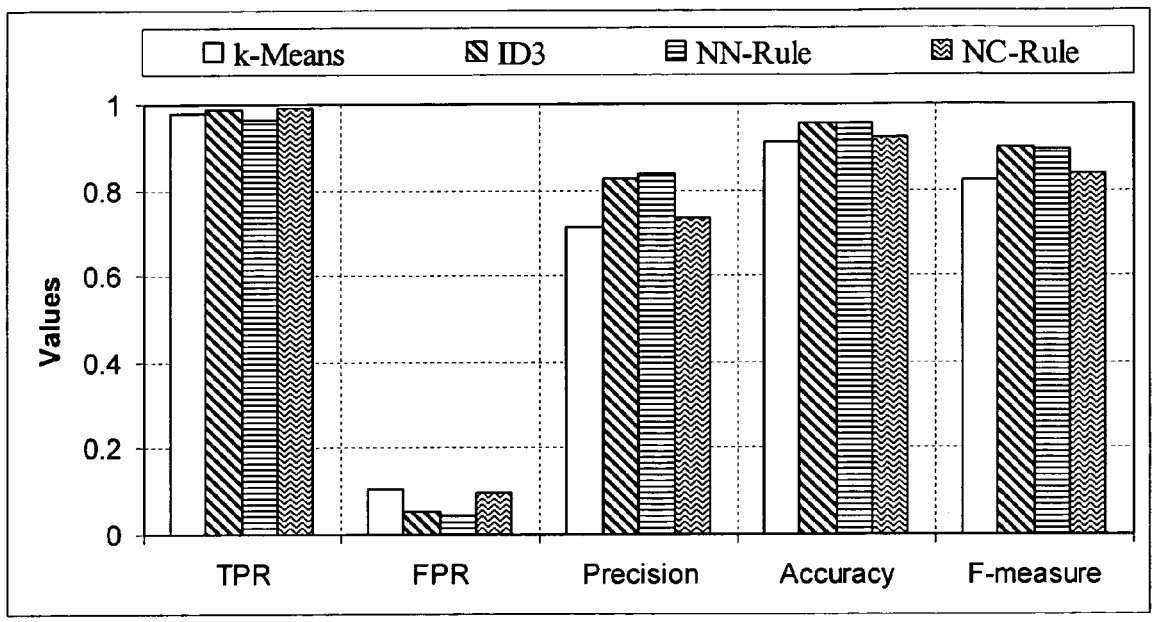
Figure 6. Performance of the k-Means, the ID3 decision tree, and the K-Means+ID3 method with Nearest-neighbor (NN-Rule) and Nearest-consensus (NC-Rule) combination rules over the NAD-1999 test dataset.

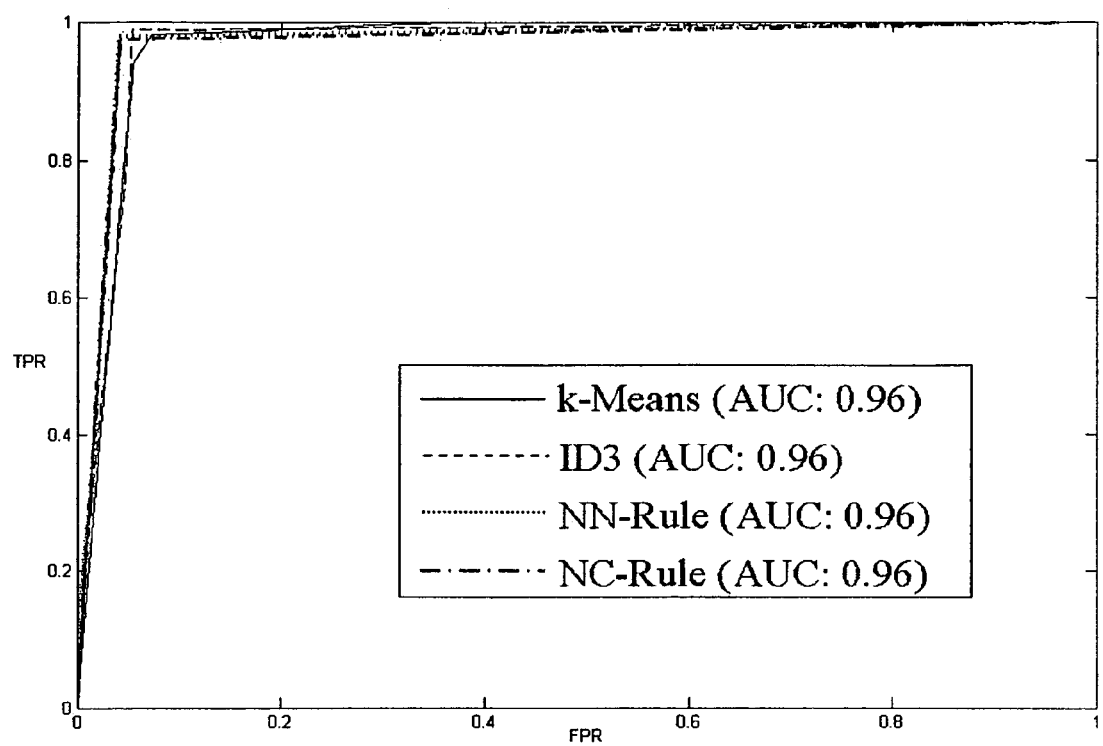
Figure 7. ROC Curves and AUCs of k-Means, ID3, and K-Means+ID3 with NN-Rule and NC-Rule over the NAD-1999 test dataset.

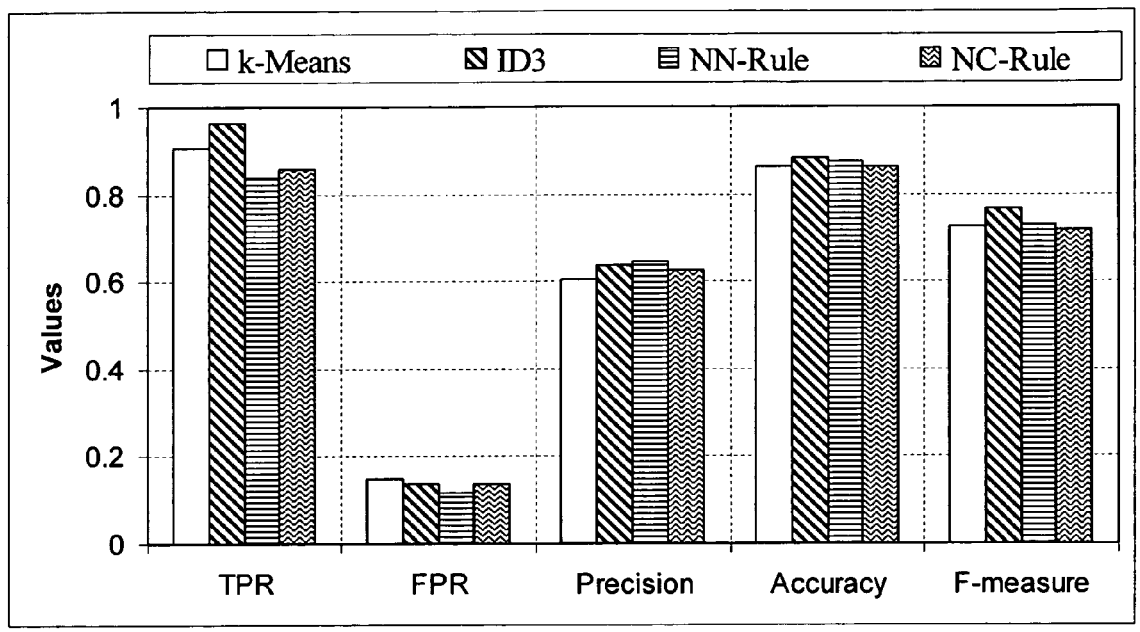
Figure 8. Performance of the k-Means, the ID3 decision tree, and the K-Means+ID3 method with Nearest-neighbor (NN-Rule) and Nearest-consensus (NC-Rule) combination rules over the NAD-2000 test dataset.

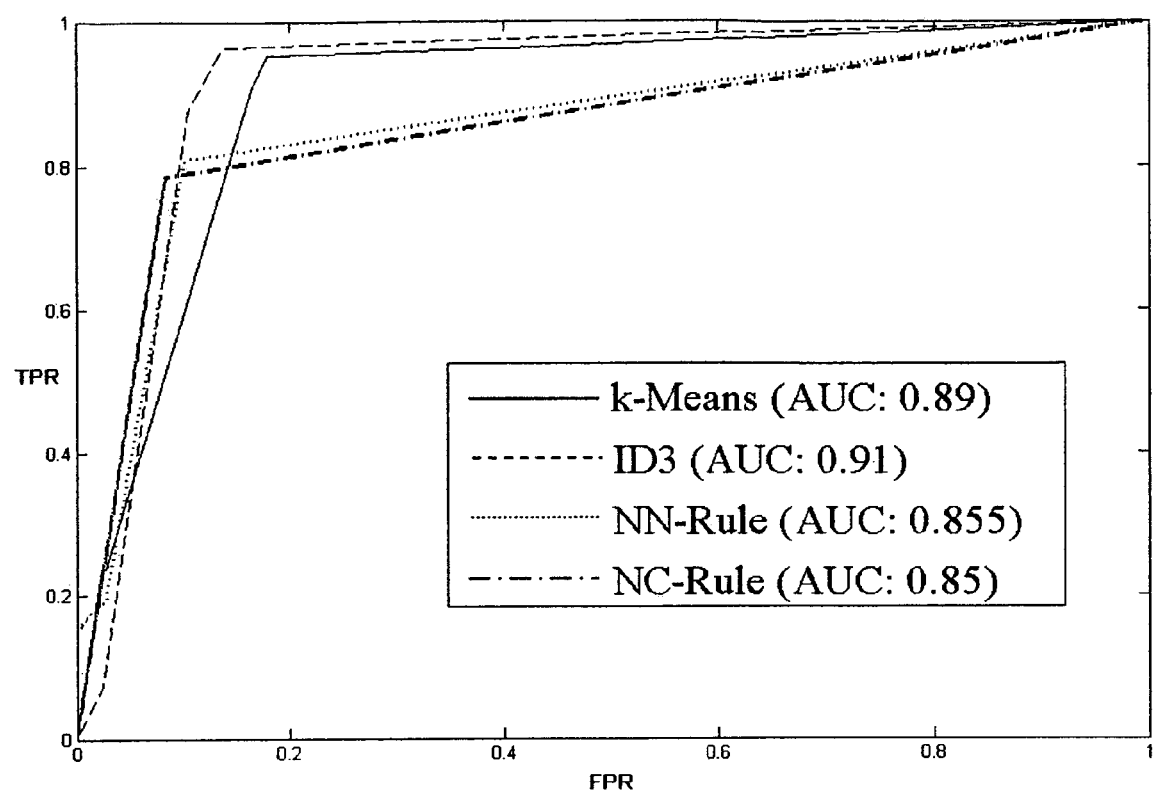
Figure 9. ROC Curves and AUCs of k-Means, ID3, and K-Means+ID3 methods over the NAD-2000 test dataset.

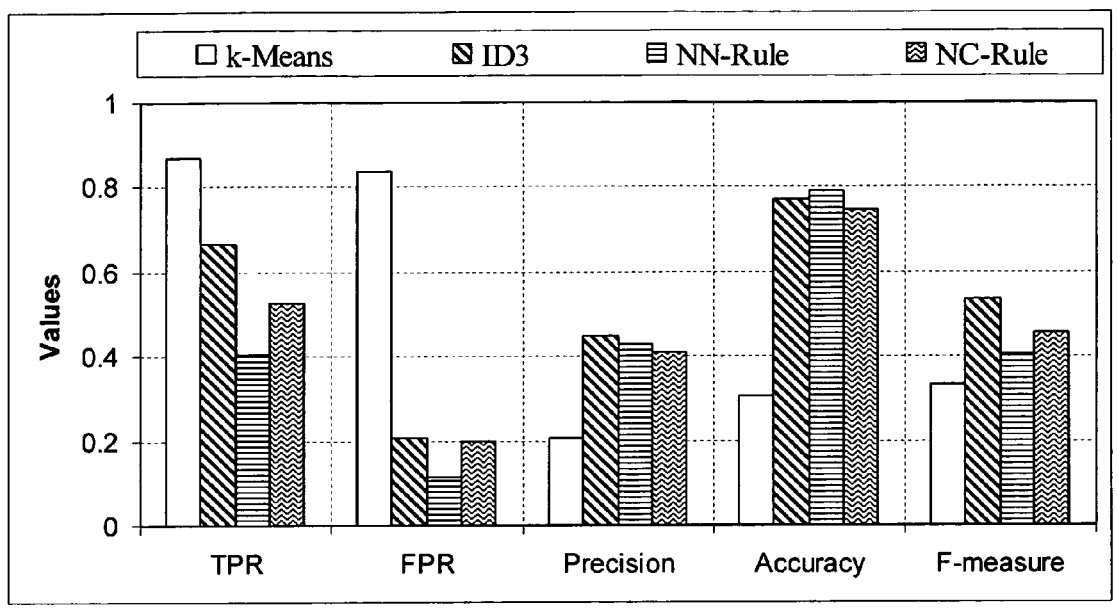
Figure 10. Performance of the k-Means, the ID3 decision tree, and the K-Means+ID3 method with Nearest-neighbor (NN-Rule) and Nearest-consensus (NC-Rule) combination rules over the DED test dataset.

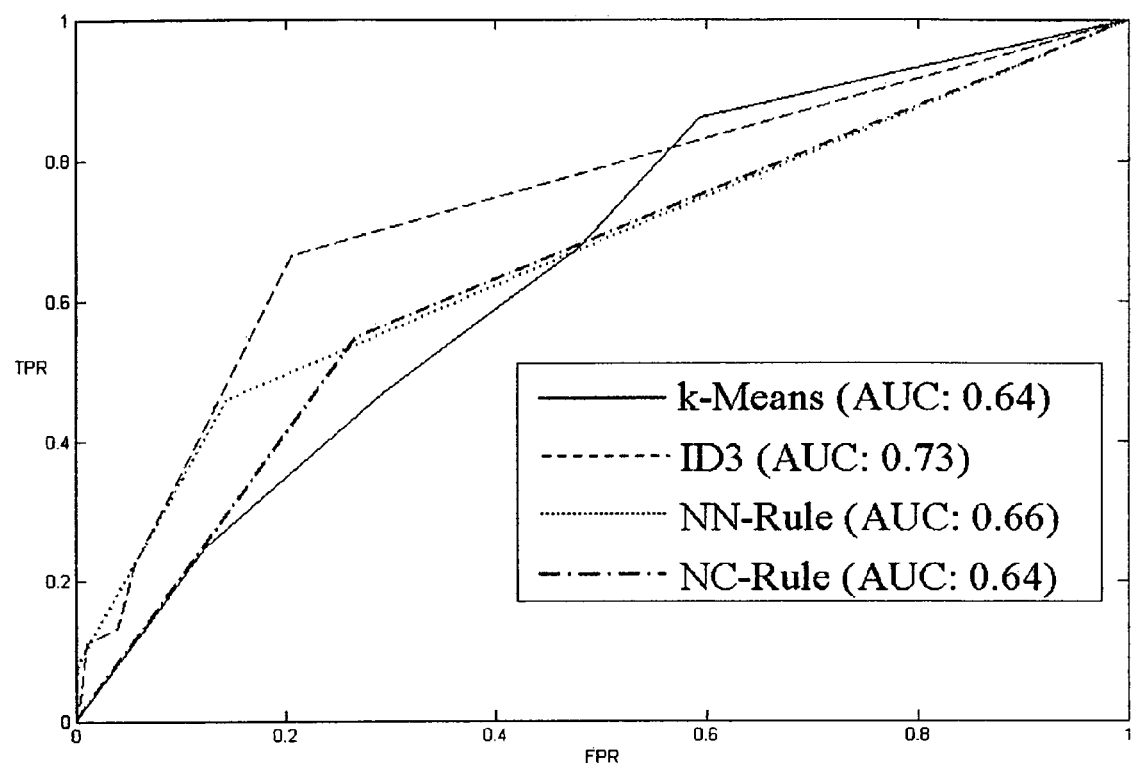
Figure 11. ROC Curves and AUCs of k-Means, ID3 and K-Means+ID3 methods over the DED test dataset.

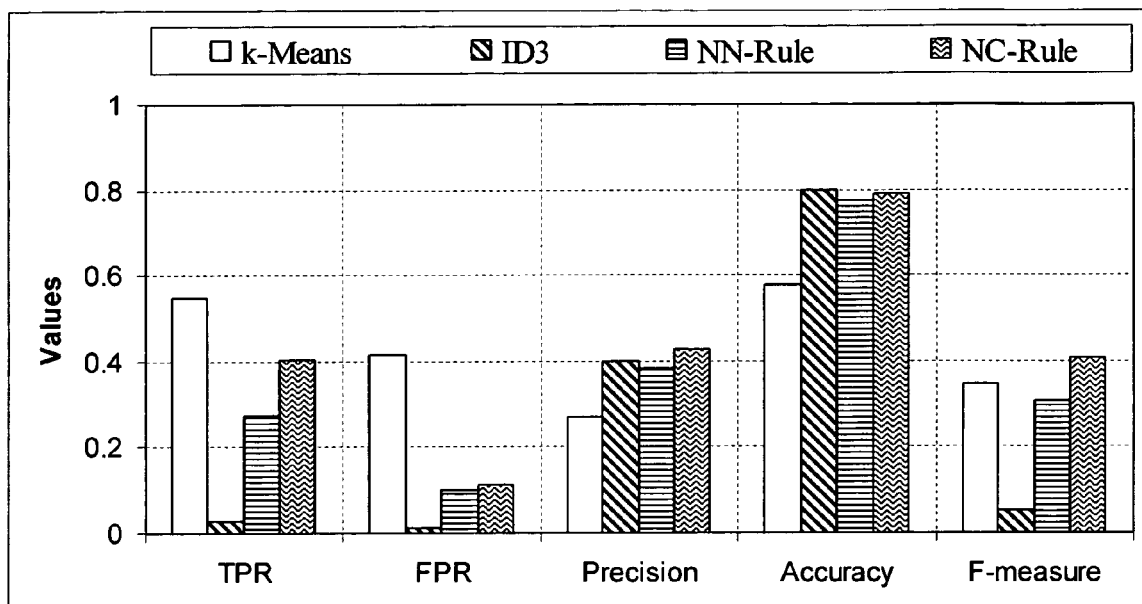
Figure 12. Performance of the k-Means, the ID3 decision tree, and the K-Means+ID3 method with Nearest-neighbor (NN-Rule) and Nearest-consensus (NC-Rule) combination rules over the MSD test dataset.

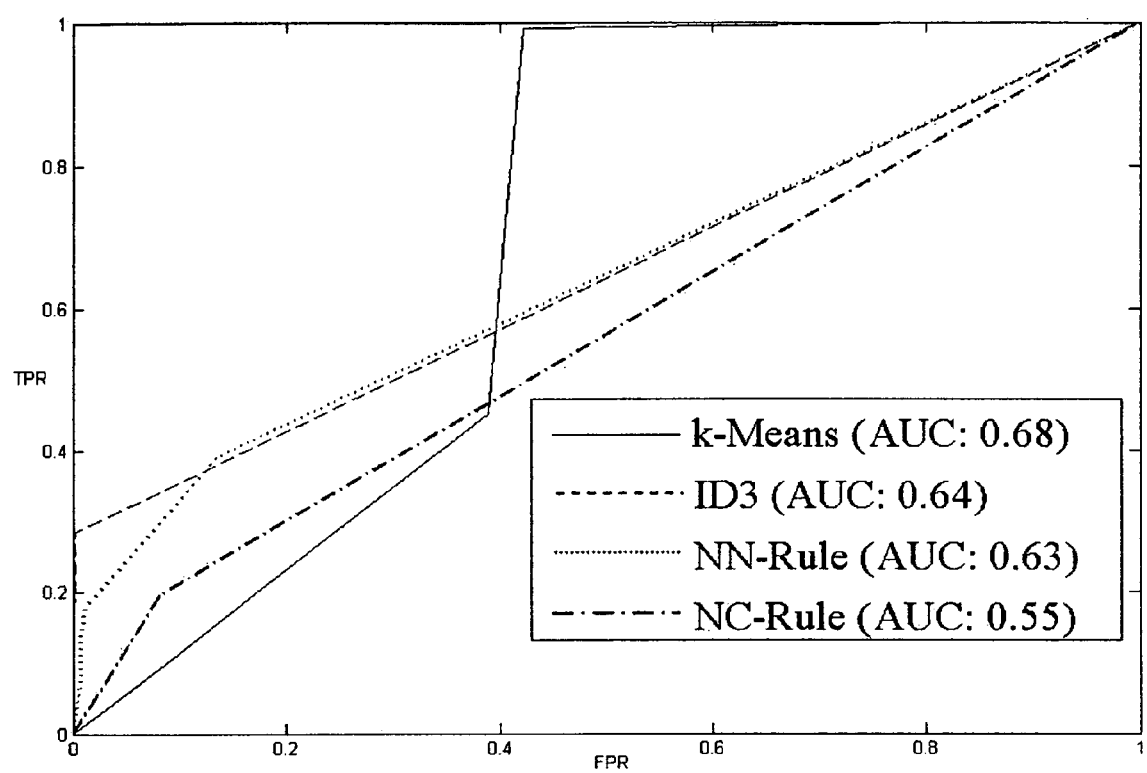
Figure 13. ROC Curves and AUCs of k-Means, ID3 and K-Means+ID3 methods over the MSD test dataset.

METHOD TO INDENTIFY ANOMALOUS DATA USING CASCADED K-MEANS CLUSTERING AND AN ID3 DECISION TREE

PRIORITY CLAIM

This application is a continuation-in-part of U.S. application Ser. No. 11/844,834 filed on Aug. 24, 2007 and claims priority thereto, and is herein incorporated by reference.

FUNDING

This work was supported in part by the US Army Research Office under Grant No. DAAD 19-01-1-0646. The U.S. Government may have rights in this invention according to the terms specified in the grant.

COMPUTER PROGRAM LISTING APPENDIX

Attached hereto and incorporated by reference is the computer program listing appendices. The appendices, in accordance with 37 CFR 1.96, are contained on a single compact disk, submitted in duplicate. The directory for each disk is as follows:

| 04/13/2008 07:42 PM | | 393 | Contents.txt |
| 04/13/2008 07:43 PM | | 5,920 | Directory Listing.txt |
| 04/13/2008 07:42 PM | | 4,989 | Source File Info.txt |
| 04/13/2008 07:43 PM | <DIR> | | Src |

The source files of the k-Means+ID3 computer program are contained in the "src" folder, which is structured as follows:

Directory of E:\K-Means+ID3 Software\Src

| 04/09/2008 02:07 PM | <DIR> | src |

Directory of E:\K-Means+ID3 Software\Src\src

| 04/09/2008 02:07 PM | <DIR> | edu |

Directory of E:\K-Means+ID3 Software\Src\src\edu

| 04/09/2008 02:07 PM | <DIR> | latech |

Directory of E:\K-Means+ID3 Software\Src\src\edu\latech

| 04/09/2008 02:07 PM | <DIR> | adam |

Directory of E:\K-Means+ID3 Software\Src\src\edu\latech\adam

| 04/09/2008 02:07 PM | <DIR> | tool |

Directory of E:\K-Means+ID3 Software\Src\src\edu\latech\adam\tool

| 04/09/2008 02:07 PM | <DIR> | capture |
| 04/09/2008 02:07 PM | <DIR> | classifier |
| 04/09/2008 02:07 PM | <DIR> | detection |
| 04/09/2008 02:07 PM | <DIR> | exception |
| 04/09/2008 02:07 PM | <DIR> | integration |
| 04/09/2008 02:07 PM | <DIR> | preprocessing |
| 04/09/2008 02:07 PM | <DIR> | util |

Directory of E:\K-Means+ID3 Software\Src\src\edu\latech\adam\tool\capture

| 02/10/2008 04:12 PM | 3,360 | EthernetPacket.java |
| 02/10/2008 04:12 PM | 2,915 | EthernetProtocol.java |
| 02/10/2008 04:11 PM | 11,139 | IPPacket.java |
| 02/10/2008 04:11 PM | 4,899 | IPProtocol.java |
| 02/10/2008 04:11 PM | 4,938 | LinkLayer.java |
| 02/10/2008 04:11 PM | 541 | Packet.java |
| 02/10/2008 04:11 PM | 4,825 | PacketCapture.java |
| 02/10/2008 04:11 PM | 1,482 | PacketCaptureFactory.java |
| 02/10/2008 04:11 PM | 267 | PacketHandler.java |
| 02/10/2008 04:11 PM | 1,133 | PacketHeader.java |
| 02/10/2008 04:10 PM | 6,116 | PacketUtilities.java |
| 02/10/2008 04:10 PM | 8,753 | TCPPacket.java |
| 02/10/2008 04:10 PM | 2,917 | UDPPacket.java |

Directory of E:\K-Means+ID3 Software\Src\src\edu\latech\adam\tool\classifier

| 02/10/2008 02:42 PM | 428 | Classifier.java |
| 02/10/2008 02:42 PM | 2,473 | DecisionTreeC45.java |
| 02/10/2008 02:41 PM | 4,409 | DecisionTreeC45AttrType.java |
| 02/10/2008 02:41 PM | 6,926 | DecisionTreeC45Basic.java |
| 02/10/2008 02:41 PM | 15,195 | DecisionTreeC45Test.java |
| 02/10/2008 02:42 PM | 21,245 | DecisionTreeC45Train.java |
| 02/10/2008 02:44 PM | 4,181 | DecisionTreeID3.java |
| 02/10/2008 02:48 PM | 10,673 | DecisionTreeID3Basic.java |
| 02/10/2008 02:58 PM | 478 | DecisionTreeID3Results.java |
| 02/10/2008 02:55 PM | 15,629 | DecisionTreeID3Test.java |
| 02/10/2008 02:53 PM | 12,121 | DecisionTreeID3Train.java |
| 02/10/2008 02:50 PM | 4,998 | DisplayTree.java |
| 02/10/2008 03:02 PM | 3,620 | DTAlgorithmSelection.java |
| 02/10/2008 03:11 PM | 650 | DTTreeNode.java |
| 02/10/2008 03:11 PM | 711 | DTTreeNodeC45.java |
| 02/10/2008 03:12 PM | 3,590 | FusionChoices.java |
| 02/10/2008 03:10 PM | 29,922 | FusionClassifier.java |
| 02/10/2008 03:06 PM | 3,307 | KMeans.java |
| 02/10/2008 03:13 PM | 5,784 | KMeansBasic.java |
| 02/10/2008 03:17 PM | 5,160 | KMeansResult.java |
| 02/10/2008 03:19 PM | 7,276 | KMeansSettings.java |
| 02/10/2008 03:22 PM | 8,472 | KMeansStats.java |
| 02/10/2008 03:26 PM | 8,849 | KMeansTest.java |
| 02/10/2008 03:24 PM | 17,096 | KMeansTrain.java |
| 02/10/2008 03:17 PM | 416 | Options.java |

Directory of E:\K-Means+ID3 Software\Src\src\edu\latech\adam\tool\detection

| | | |
|---|---|---|
| 02/10/2008 04:12 PM | 9,414 | CUSUM.java |
| 02/10/2008 04:12 PM | 2,062 | CUSUMTest.java |
| 02/10/2008 04:12 PM | 1,852 | CUSUMTrain.java |

Directory of E:\K-Means+ID3 Software\Src\src\edu\latech\adam\tool\exception

| | | |
|---|---|---|
| 02/10/2008 04:14 PM | 476 | DeviceCloseException.java |
| 02/10/2008 04:13 PM | 484 | DeviceLookUpException.java |
| 02/10/2008 04:13 PM | 492 | DeviceNotFoundException.java |
| 02/10/2008 04:13 PM | 471 | DeviceOpenException.java |
| 02/10/2008 04:13 PM | 486 | DumpFileCloseException.java |
| 02/10/2008 04:13 PM | 481 | DumpFileOpenException.java |
| 02/10/2008 04:13 PM | 485 | DumpFileWriteException.java |
| 02/10/2008 04:13 PM | 495 | PacketCaptureException.java |
| 02/10/2008 04:13 PM | 497 | PacketFilterSetException.java |
| 02/10/2008 04:13 PM | 511 | RemoteUnknownHostException.java |
| 02/10/2008 04:12 PM | 520 | TCPDumpFileNotFoundException.java |

Directory of E:\K-Means+ID3 Software\Src\src\edu\latech\adam\tool\integration

| | | |
|---|---|---|
| 02/10/2008 04:15 PM | 3,762 | AboutProject.java |
| 02/10/2008 04:15 PM | 6,530 | CaptureSettings.java |
| 02/10/2008 04:15 PM | 28,325 | DataCaptureDialog.java |
| 02/10/2008 04:14 PM | 4,083 | FilterSettings.java |
| 02/10/2008 04:14 PM | 8,058 | HelpContents.java |
| 02/10/2008 04:14 PM | 5,776 | ListNetAdapters.java |
| 02/10/2008 04:14 PM | 19,366 | Main.java |
| 02/10/2008 04:14 PM | 7,805 | PacketCountSettings.java |
| 02/10/2008 04:14 PM | 3,170 | SwingWorker.java |

Directory of E:\K-Means+ID3 Software\Src\src\edu\latech\adam\tool\preprocessing

| | | |
|---|---|---|
| 02/10/2008 03:49 PM | 8,883 | Discretize.java |
| 02/10/2008 03:51 PM | 6,066 | RandomFileGenerator.java |

Directory of E:\K-Means+ID3 Software\Src\src\edu\latech\adam\tool\util

| | | |
|---|---|---|
| 02/10/2008 03:33 PM | 6,566 | ConfusionMatrix.java |
| 02/10/2008 03:35 PM | 33,855 | ROC.java |

The source files are written in JAVA programming language. Additionally, the CD contains:

(a) the file "Directory Listing" which lists all the files in the "src" folder and (b) the file "Source File Info" which describes the files in the "src" folder that implement the K-Mean+ID3, the k-Means, and the ID3 methods for anomaly detection.

Hardware and Software Considerations

The "IAMS Software Tool.jar" software program executable has been tested on a 3.6 GHz Pentium PC with 2.0 GB memory, running Windows XP operating system.

FIELD OF INVENTION

This invention relates to machine detection of anomalous data entries in a given dataset having known characteristics. Datasets reflecting ongoing operations, evolutional (time sequence) data, or data type characterization (reflecting behavior attributes that can be classified as normal or expected, or anomalous or unexpected) and other data types can be input into the system. The invention uses a training data set to organize attributes of the dataset into normal and anomalous characteristics, and uses the characteristics of the training data set to predict the nature of new data as normal or anomalous.

BACKGROUND OF THE INVENTION

Data collection is undertaken for a variety of reasons, such as to document/monitor system performance (such as a manufacturing plant performance), to monitor usage (such as traffic on a telecommunications system, such as the internet), or to predict characteristics for decision making (such as to predict a credit card use as fraudulent). A variety of data manipulation techniques allows information to be extracted from a data set, such as trend curve analysis, statistical analysis, feature extraction, etc., and the analysis can be used to identify or characterize a data point as "anomalous," or a substantial deviation from a data set tendency. If the data set is analyzed using trend analysis, for instance, a particular data point may be characterized as anomalous if it is more than a designated distance from a fitted trend; if a statistical analysis is used, a data point may be considered anomalous if it is more than a designated number of standard deviations away from some measure of central tendency. The particular scheme used to characterize, organize or "measure" the data set will provide a means of distinguishing "anomalous" from non-anomalous.

Data set characterization can require substantial user input and knowledge of the data set. To overcome the need for user supervision or input, data set manipulation techniques have been developed that attempt to learn from a training data set, such as those using machine learning techniques like artificial neural-networks, Kohonen's self-organizing maps, fuzzy classifiers, symbolic dynamics, multivariate analysis, and others. These techniques have become popular because of their high detection accuracies at low false positive rates. However, the techniques have two drawbacks: (1) most of these techniques are not readily adapted to different applications; and (2) these techniques construct anomaly detection methods with single machine learning methods like artificial neural-networks, pattern matching, etc.

SUMMARY OF THE INVENTION

An anomaly detection system is built by cascading two machine learning algorithms: (1) k-Means clustering and (2) the ID3 decision tree learning. These cascaded techniques are used on a "training" dataset where each data point X, can be represented as a n dimensional vector $(x_1, x_2, \ldots, x_n)$. The training data set $\{X_i\}$ has known instances that are considered anomalous. In the first stage, k-Means clustering is performed on training instances $\{X_i\}$ to obtain k disjoint clusters. Each k-means cluster represents a region of similar instances, 'similar' in terms of a chosen metric, such as Euclidean distances between the instances and the cluster "center" or center tendency, such as the centroid.

In the second stage of dataset characterization, each cluster of learning instances is further characterized using the known ID3 decision tree learning. In ID3 characterization, the ID3 algorithm builds a decision tree from the set. The leaf nodes of the decision tree contain the class name whereas a non-leaf node is a decision node. Each leaf node contains one of the two characterizations: (1) non-anomalous or (2) anomalous. The ID3 algorithm uses information gain to help it decide which attribute goes into a decision node.

The algorithm is executed on a computer having inputs, outputs and databases. The results from the training set, e.g. cluster identification and ID3 decision tree structure for each cluster, can be stored for later use on an data set to be identified, or can be computed on a run by run basis of the cascaded learning techniques on unknown data. See S. R. Gaddam, V. V. Phoha, and K. S. Balagani, *K-Means+ID3: A Novel Method for Supervised Anomaly Detection by Cascading k-Means Clustering and ID3 Decision Tree Learning Methods*, IEEE Transactions on Knowledge and Data Engineering, vol. 19, no. 1, 2007, hereby incorporated by reference. A general references on the ID3 method is *Machine Learning*, by Tom M. Mitchell, McGraw-Hill 1 edition (Mar. 1, 1997). A general reference on the K-Means method is *Pattern Classification* (2nd Edition) by Richard O. Duda, and Peter E. Hart, (see pages 526-528, 581) and it also briefly covers ID3 (Section 8.4.1). Both general references are incorporated herein by reference.

BRIEF DESCRIPTION OF THE FIGURES

FIG. 1 is an outline of the generalized procedure of Candidate Selection, for a particular embodiment.

FIG. 2 is an object diagram of the method showing extraction of k-Means and ID3 decision tree scores from f=3 candidate clusters for the test instance $Z_i$.

FIG. 3 is an example anomaly score matrix for test instance Z. The anomaly scores of the k-Means method are hardened using the Threshold rule.

FIG. 4 is a series of bar graphs demonstrating the performance of the k-Means, the ID3 decision tree, and the K-Means+ID3 method with Nearest-neighbor (NN-Rule) and Nearest-consensus (NC-Rule) combination rules over the NAD-1998 test dataset.

FIG. 5 is a plot of the ROC Curves and AUCs of k-Means, ID3, and K-Means+ID3 with NN-Rule and NC-Rule over the NAD-1998 test dataset.

FIG. 6 is a series of bar graphs demonstrating the performance of the k-Means, the ID3 decision tree, and the K-Means+ID3 method with Nearest-neighbor (NN-Rule) and Nearest-consensus (NC-Rule) combination rules over the NAD-1999 test dataset.

FIG. 7 is a plot of the ROC Curves and AUCs of k-Means, ID3, and K-Means+ID3 with NN-Rule and NC-Rule over the NAD-1999 test dataset.

FIG. 8 is a series of bar graphs demonstrating the performance of the k-Means, the ID3 decision tree, and the K-Means+ID3 method with Nearest-neighbor (NN-Rule) and Nearest-consensus (NC-Rule) combination rules over the NAD-2000 test dataset FIG. 9 is a plot of the ROC Curves and AUCs of k-Means, ID3, and K-Means+ID3 methods over the NAD-2000 test dataset.

FIG. 10 is a series of bar graphs demonstrating the performance of the k-Means, the ID3 decision tree, and the K-Means+ID3 method with Nearest-neighbor (NN-Rule) and Nearest-consensus (NC-Rule) combination rules over the DED test dataset.

FIG. 11 is a plot of the ROC Curves and AUCs of k-Means, ID3 and K-Means+ID3 methods over the DED test dataset FIG. 12 is a series of bar graphs demonstrating the performance of the k-Means, the ID3 decision tree, and the K-Means+ID3 method with Nearest-neighbor (NN-Rule) and Nearest-consensus (NC-Rule) combination rules over the MSD test dataset FIG. 13 is a plot of the ROC Curves and AUCs of k-Means, ID3 and K-Means+ID3 methods over the MSD test dataset.

DETAILED DESCRIPTION OF THE INVENTION

The invention accepts an inputted training dataset (a learning instance) having known anomalous data points (each data point being a point in m dimensional space) and executes instructions to: (1) to create clusters of the dataset using k-means, and then organizes each identified k-means cluster into a decision tree using the ID3 algorithm. The resultant cluster identification and associated ID3 decision tree may be stored for later use or is directly input into the cascaded system operating on non-training set data. The k-means algorithm is used to organize the learning instance into disjoint subsets or "clusters," where each member in a cluster is more closely related to other members in its associated cluster than to members in other clusters. After k-means clustering is complete, an assignment is made for each cluster as a whole as "anomalous" or "non-anomalous," based upon the percentage of anomalous data points in the particular cluster.

Each cluster is then subjected to the ID3 decision tree algorithm to impose a fine structure on each cluster. Once the training set is organized into clusters and associated decision trees, unknown data is compared to the classification system established by the training data set (e.g cluster and ID3 decision tree). From this classification scheme, the unknown point will be (a) examined for closeness to the clusters, and for the closest clusters, (b) the characterization of the point as "anomalous" (arbitrarily assigned a real value of 1) or "non-anomalous" or "normal" (arbitrarily assigned a value of 0) is characterized by each cluster's ID3 decision tree as applied to the unknown data point. This ID3 decision tree's characterization is compared against the associated cluster's characterization, and the first conformity between the two characterizations (i.e. examine conformance with the closest cluster, and if no conformance, move to the next closest cluster, etc, repeat until conformance is obtained between cluster characterization and cluster ID3 decision tree data point characterization) is that characterization assigned to the unknown data point. Each step of the process will be described in more detail.

K-Means Clustering

The k-means procedure is an easily implemented, unsupervised learning algorithm. The procedure follows a simple and easy way to classify a given data set through a pre-selected number of clusters.

Start with Training Data Set.

The k-means algorithm reads in or accepts n-dimensional data points of the training set. The k-means algorithm groups the N data points into k disjoint clusters where k is a pre-defined parameter. The organization scheme is a gross granular organization of the training data set. The cluster organization scheme is to organize the dataset using "closeness" (using a chosen metric to measure distance) to selected cluster centers. The idea is to select k cluster "centers," and in the examples that follow, the centers chosen are points representing centroids of the clustered data, one for each cluster. The centroid is one common measure of central tendency that can be used in the k-means aspect of the invention, but other measure of central tendency could be used, such as the mean. Computation of the centroid may be taken over a pre-selected subset of the n-dimensions.

The next step is to take each data point belonging to a given data set and associate it to the nearest cluster centroid (using the same selected subset, say of m dimensions). When no point is pending, the first step is completed and an early groupage is established. At this point, one can re-calculate k new centroids as barycenters of the clusters resulting from the previous step. After determining these k new centroids, a new binding has to be done between the same data set points and the nearest new centroid. A loop has thus been generated. As a result of this loop, the k centroids change their location step by step until no more changes are done. In other words, the centroids stabilize (i.e., do not move any more).

Finally, this k-means algorithm aims at minimizing an objective function, in this case a sum-of-squared-error function. The objective function $$J_e = \sum_{i=1}^{k} \sum_{X \in C_i} \|X - R_i\|,$$

where $R_i$ is the centroid of the cluster $C_i$ and $\|X-R_i\|$ is a chosen distance measure between a data point X and its cluster centre. The sum-of-squared error function is an indicator of the distance of the data points from their respective cluster centroids, and as described, the distance can be taken over a subset of the n-dimensions comprising each datapoint.

The steps in the k-Means clustering based anomaly detection method are as follows.

1. Input the pre-selected k random instances from the training data subset as the centroids of the clusters $C_1, C_2, \ldots C_k$.

2. Input the training data set. For each training instance X (data point), where X is a m-dimensional ($m \leq n$) vector representing the attributes (or pre-selected attributes) of the data points;
   a. Compute the Euclidean distance $D(C_i, X)$, $i=1 \ldots k$. Find cluster $C_q$ that is closest to X. The distance may be calculated over all dimensions of the vector space, or only over a subspace of the vector space; this will vary depending on the attributes of the data points (for instance, the attributes for a particular dimension X could be the day of the week, the month of the year, the presence or absence of a chemical, etc).
   b. Assign X to $C_q$. Store the assignment for future use. Update the centroid of $C_q$ and store. (The centroid of a cluster is the arithmetic mean of the instances in the cluster, and as indicated above, other measures of central tendency could be used to define cluster "centers")

Repeat step (2) until the centroids of clusters $C_1, C_2, \ldots C_k$ stabilize in terms of sum-of-squared-error criterion.

3. For each cluster, a global "characterization" is assigned as to the nature of the cluster as anomalous or non-anomalous. Two possible rules for characterization of the cluster have been tested:
   (a) assign the cluster the characterization 1 (anomalous) if the percentage of anomalous data points within the cluster exceeds a predetermined threshold; otherwise assign the characterization 0 or normal (designated the "Threshold Rule"); or
   (b) assign the cluster the characterization 1 if the percentage of anomalous data points within the cluster exceeds a predetermined threshold (that is percentage of anomalous>0.5) otherwise assign the characterization 0. Note that the two rules are identical if the threshold percentage in rule (a) is $\geq 0.5$ (designated the Bayes Rule.)
   (c) alternatively and preferred, the cluster could be assigned a probability of being anomalous P(A) or normal P(N), based upon the decimal percentage x ($0.0 \leq x \leq 1.0$) of the normal N or anomalous A datapoints in the cluster.

Whatever the rule chosen, for each cluster, store the assignment for each cluster and the cluster "center" definition. At this point, from the training data set, k clusters have been identified, each cluster having a "center" and a characterization as normal or anomalous.

Next, each cluster is subjected to the ID3 Decision tree algorithm.

The algorithm is also sensitive to the initial randomly selected cluster centers. The k-means algorithm can be run multiple times to reduce this effect. Further, there is no general theoretical solution to find the optimal number of clusters for any given data set. A simple approach is to compare the results of multiple runs with different k classes and choose the best one according to a given criterion.

ID3 Decision Trees

The ID3 decision tree learning algorithm computes the information gain G on each attribute $x_i$, defined as:

$$G(S, x) = Entropy(S) - \sum_{v \in Values(x_i)} \frac{|S_v|}{|S|} Entropy(S_v), \quad \text{EQ 1}$$

where

S is the total input space $S_v$ is the subset of S for which attribute $x_i$ has a value v $$\sum_{v \in Values(x_i)}$$

is the summation over each value v of all possible values of attribute $x_i$ $S_v$=subset of S for which attribute $x_i$ has value v $|S_v|$=number of elements in $S_v$ $|S|$=number of elements in S The Entropy(S) over c classes is given by $$\sum_{i=1}^{c} -p_i \log_2(p_i),$$

where $p_i$ represents the probability of class 'i' (for a discrete set, this is the percentage of the set belonging to class 'i'). Similarly, the Entropy($S_v$) over c classes is given by $$\sum_{i=l}^{c} -q_i \log_2(q_i),$$

where $q_i$ is the probability of class 'i' in the input set $S_v$ for which the attribute $x_t$ has value v.

The attribute (or dimension) with the highest information gain, say attribute $x_k$, is chosen as the root node of the tree. The root has branches that extend from the root, and the branches represent possible values of the attribute $x_k$. For discrete valued attribute, there can be as many branches as values for the attribute. For an attribute having a continuous value, the branches should be limited by some scheme. Generally, the scheme is to partition the attribute value into bins. For instance, where the attribute value has a range from 0.0 to 1.0, a bin system of 5 bins might be $0.0 \leq val < 0.2$, $0.2 \leq val < 0.5$, $0.5 \leq val < 0.6$, $0.6 \leq val < 0.7$, $0.7 \leq val \leq 1.0$. Where the attribute has continuous values, a decision is made on how to partition the value range for the ID3 tree method. For instance, equal width binning can be used, or the bin boundaries can be set based upon an ordering of normal or anomalous or some other scheme (for instance, if the attribute value ranges continuously from 0.0 to 1.0, and the training set has normal readings in 0.0-0.3, and 0.5-0.7 value range, and anomalous elsewhere, then 4 bins (or two bins, binning all normal ranges together, and all anomalous ranges together) could be set up along the training set ordering of normal and anomalous).

The process of selecting a new attribute and partitioning the training examples is now repeated for each non-terminal descendant node. Each non-terminal node will have a number of branches, each branch associated with a value of the attribute node. For each branch, Eq. 1 is repeated to find the next node, using a reduced set of data points, this time using only the training examples associated with the branch or attribute value under consideration. (that is, the training space is reduced to those data points that have the branch attribute value, and the entropy of all remaining unused attributes are considered and the attribute having the maximum entropy is chosen as the subnode attached to the branch under consideration). Attributes that have been incorporated higher in the tree are excluded, so that any given attribute can appear at most once along any path through the tree. This process continues for each new leaf node until either of two conditions is met:

1. every attribute has already been included along this path through the tree, or
2. the training examples associated with this leaf node all have the same target attribute value (i.e., their entropy is zero).

For instance, suppose the decision node is attribute $x_i$, with each attribute value of $x_i$ forming a branch (say three branches are formed, $x_i$=a, $x_i$=b, or $x_i$=c). A new decision tree is recursively constructed over each value of $x_i$, using, for each branch of the tree below the decision node, the training subspace Sxi={s ∈ S, and where s has all the attribute values of those previously assigned in the tree structure containing the path through the particular valued of $x_i$ (the branch value examined), the last assignment being $x_i$=branch value e.g. a, b, or c, and s}. That is, for each branch value of $x_i$, we calculate G(Sxi, xj) using Eq. 1, and where the sum is taken over all values of the attribute $x_j$ where $x_j$ is an attribute that does not appear in any previously determined node.

Again, the attribute $x_j$ having the largest "Gain" forms the next decision node on the particular $x_i$ branch, with branches below the node being the possible values of $x_j$. The process repeats until the terminal node is a classification of "normal" or "N" or "anomalous" or "A".

A subset of the dimensions (attributes) are chosen for building the decision tree (the subset may be the entire set of attributes). For each training group cluster, the ID3 technique is employed to build a decision tree for that cluster, organized along a pre-selected subset of datapoint attributes However, because each point in the training set has a known characterization as anomalous or anomalous, and each terminal node of the ID3 decision tree will be associated with a characterization of "normal" or "anomalous", where the characterization taken from the data point that is represented by the path through the tree to that particular terminal node. For each cluster, the ID3 decision tree is stored for later use.

The Cascaded Classification System

As described, the overall procedure on the training data set is as follows. A training dataset is input to the technique, ($X_i$, $Y_i$), i=1, 2, ..., N where $X_i$ represents an n-dimensional vector and $Y_i$={N, A} or {0,1} or some other values corresponding to a characterization of "normal" or "anomalous." As noted above, each dimension can reflect discrete values or continuous values. If continuous variables are used, suitable discretizing next is undertaken, replacing the continuous valued attribute with discrete values. After characterization of the training set, the k-Means method is employed to ensure that each training instance is associated with only one cluster. However, if there are any sub-groups or overlaps within a cluster, the follow up ID3 decision tree technique employed on that cluster will refine the decision boundaries by partitioning the instances with a set of if-then rules over the feature space. Once the training set is characterized, (k-Means and decision tree), the characterization can be used to test unknown data points. In general, the stored training data set characterization (e.g. center value and dimensions used in for computation of the center value, and characterization of each cluster as N or A and P(N) or P(A) for this cluster, AND the decision tree and the dimensions or attributes used in the decision tree) can be tested against the unknown datapoint to characterize the unknown point as A or N.

The testing is performed in two conceptual steps: (1) Candidate Selection phase and (2) the Candidate Combination phase. In Candidate Selection, decisions from k-Means and ID3 based anomaly detection methods are extracted (i.e., N or A, or "0" or "1"). In Candidate Combination, the decisions of the k-Means and ID3 decision tree methods are combined to give a final decision on the class membership of an unknown data instance.

The Candidate Selection Phase

FIG. 1 presents the procedure for the Candidate Selection. Let $DT_1$, $DT_2$, ... $DT_k$ be the computed and stored ID3 decision trees on clusters $C_1$, $C_2$, ... $C_k$ formed by applying the k-Means method on the training instances. Let $r_1, r_2, \ldots r_k$ be the stored centers (as implemented, the centroids) of $C_1$, $C_2$, ... $C_k$ respectively. Given an unknown data point or a "test instance" $Z_i$, the Candidate Selection procedure extracts "anomaly scores" from f candidate clusters $G_1, G_2, \ldots G_f$. The 'f candidate clusters' are f clusters in $C_1, C_2, \ldots C_k$ that are "nearest" to $Z_i$ in terms of the metric distance (as implemented, the Euclidean distance) between $Z_i$ the cluster centroids. For instance, f could be five, that is, use the five "closest" clusters in the remaining analysis. 'f' is a user-defined parameter. Alternatively, a pre-determined distance could be used, and each cluster within the predetermined distance from the test instance could be passed to the next step. In general, the distance between the data point and the centers of the clusters are calculated, and the clusters identified with the smallest distances from the datapoint are identified for further processing.

FIG. 2 illustrates the extraction of anomaly scores from k-Means clustering and ID3 decision tree learning methods for f candidate clusters. Let $m_1, m_2, \ldots, m_f$ represent the centroids of candidate clusters $G_1, G_2, \ldots, G_f$. Let $D(Z_i, m_2)=d_1$, $D(Z_i, m_2)=d_2$, and $D(z_i, m_f)=d_f$ represent the computed Euclidean distances between the test vector $Z_i$ and the f previously identified candidate clusters. The k-Means anomaly scores $P_s$, $s=1, \ldots, f$, for each of the f candidate clusters is calculated in a preferred embodiment as $$P_s = P(\omega_{1s}) \times \left[ 1 - \frac{d_s}{\sum_{l=1}^{k} D(Z_i, r_l)} \right] \quad (1)$$

where $P(\omega_{1s})$ is the probability of anomaly instances in cluster 's' (the decimal percentage of anomalies in cluster s, previously stored). In Equation (1), the term $$`1 - \frac{d_s}{\sum_{l=1}^{k} D(Z_i, r_l)},$$

is a Scaling Factor (SF). The SF scales $P(\omega_{1s})$ by weighing it against the ratio of the Euclidean distance between the cluster s and $Z_i$; and the sum of Euclidean distances between $Z_i$ and the clusters $C_1, C_2, \ldots C_k$. The SF penalizes the probability of anomaly $P(\omega_{1s})$ in cluster s with its distance from the test vector $Z_i$. A high value of $d_s$ yields a low $P_s$ value and vice versa., that is, the larger the distance between the test instance and a cluster, the greater the penalty. The scaling factor thus will cause the "closer" clusters to be given more weight in the next step. Other scaling factors could be employed or the scaling factor may be set to 1.0. The calculated anomaly score is stored for future use.

For each identified cluster, the test instance is then compared to the ID3 associated decision tree (which may have to be recalled from storage). This comparison results in a "decision" on the test instance from the ID3 decision trees one for each of the f candidate clusters, as characterizing the test instance as either '0' representing normal, or '1' representing an anomaly (this value assignment is arbitrary, you could choose −1 for normal, and 1 for anomaly, or some other assignment value, such as N or A). The decision derived from the ID3 decision tree is the terminal leaf node value based upon a particular path through the cluster's decision tree. The path chosen will be determined by examining the non-leaf point decision nodes with the test instance attribute associated with that node, and picking a path based upon the test instance's attribute value.

The Candidate Selection phase results in an f×2 dimension "anomaly score" matrix with the decisions extracted from the k-Means and ID3 anomaly detection methods for a given test instance vector, where the matrix first rows are elements are $P_i$ (defined by equation (1)) and the second for are the ID3 classification (0 or 1). This matrix is stored for further use.

The Candidate Combination Phase

The decisions stored in the anomaly score matrix are combined in the Candidate Combination phase to yield a final decision on the test vector. A detailed description of the Candidate Combination follows.

The input to the Candidate Combination phase is (a) the anomaly score matrix containing the anomaly scores $P_s$, $s=1, \ldots, f$, of the k-Means and (b) the decisions of the ID3 based anomaly detection methods over f candidate clusters. To combine the decisions of the k-Means and ID3 algorithms, it is easier, but not necessary, if the anomaly "scores" from equation (1) be converted to a digital value, either 0, or 1. Either the Threshold Rule or the Bayes Rule, described above, can be used for this purpose (e.g., for the Threshold Rule, for $P_s$, $s \in f$ and if $P_s$>threshold value, then $P_s=1$, otherwise $P_s=0$). This procedure modifies the f×2 matrix values into a matrix of 0s s or 1s, as shown in FIG. 3.

A characterization of the test instance as anomalous or normal is made from this modified matrix. Two schemes have been examined for the characterization: (1) the Nearest-consensus rule and (2) the Nearest-neighbor rule to combine the decisions.

Nearest-Consensus Rule

FIG. 3 shows an example of an anomaly score matrix for the test vector Z. The f candidate clusters $G_1, G_2, \ldots, G_f$ are ordered in the anomaly score matrix such that the distances $d_1, d_2, \ldots, d_f$ between Z and the candidate clusters $G_1, G_2, \ldots, G_f$ respectively, satisfy $d_1 < d_2 < \ldots < d_f$. In the Nearest-consensus rule, the decision of the nearest candidate cluster in which there is consensus or agreement between the decisions of the k-Means and the ID3 decision tree methods is selected as the combined classification decision. For example, in the anomaly score matrix shown, the nearest consensus occurs in candidate cluster $G_2$ where the consensus is "anomalous" and therefore the test instance vector is classified as '1' i.e., an anomaly.

Nearest-Neighbor Rule

The Nearest-neighbor rule chooses the decision of the ID3 decision tree that is associated with the nearest candidate cluster within the f candidate clusters. In the anomaly score matrix shown in FIG. 3, $G_1$ is the nearest candidate cluster to the test vector Z. Therefore, the nearest-neighbor rule classifies the test vector as '0' (normal), which is the decision of the ID3 decision tree associated with candidate cluster $G_1$.

A number of possible schemes to assign a characterization to the data points could be utilized, for instance, using the nearest clusters, the majority characterization as determined by the ID3 trees could be used, or a weighted characterization (using a scaling technique such as discussed above and a threshold number to evaluate the computed characterization, etc.). In any event, a characterization is found and output or stored.

The above procedure can be utilized on a single test data point, or an a large set of unknown data points to characterize every datapoint in the set as N or A. The program can be implement to test one at a time, or in batch processing.

Test Datasets

The above method was implemented and used on three datasets: (1) Network Anomaly Data (NAD), (2) Duffing Equation Data (DED), and (3) Mechanical Systems Data (MSD) to analyze data for anomalous data points.

The NAD contains three data subsets: (i) NAD-98, (ii) NAD-99, and (iii) NAD-00, datasets obtained by feature-extracting the 1998, 1999, and 2000 MIT-DARPA network traffic. The DED dataset was obtained from an active non-linear electronic circuit implementing a second-order forced Duffing equation. The MSD dataset was obtained from an apparatus designed to induce small fatigue cracks in ductile alloy (mass-beam) structures.

TABLE 1

Characteristics of the NAD, DED and MSD datasets used in the anomaly detection experiments.

| Datasets | | Dimensions | Training Instances | | Testing Instances | |
|---|---|---|---|---|---|---|
| | | | Normal | Anomaly | Normal | Anomaly |
| NAD | 1998 | 12 | 3500 | 1500 | 2000 | 500 |
| | 1999 | 10 | 3500 | 1500 | 2000 | 500 |
| | 2000 | 10 | 294 | 126 | 336 | 84 |
| DED | | 4 | 1288 | 502 | 860 | 215 |
| MSD | | 4 | 3500 | 1500 | 2000 | 500 |

Table 1 summarizes the proportion of normal and anomaly instances, and the number of dimensions (or tracked attributes) in the three datasets. The training and testing data subsets were randomly drawn from the original NAD, DED, and MSD datasets. The number of instances in all the training data subsets was restricted to at most 5000 instances, with 70% of them being normal and the rest being anomaly instances. The testing datasets contain at most 2500 unseen instances (i.e., those that are not included in training data subsets), with 80% of them being normal and the remaining 20% being anomaly instances. The ratio of training datasets to the testing datasets is 65% to 35%, except for the NAD-2000 and DED datasets. The training to testing dataset ratio for DED is 60% to 40% and for the NAD-2000 is 50% to 50%. The NAD-2000 and DED datasets contain comparatively less number of training and testing instances because of the limited number of normal instances available in DED and the limited number of anomaly instances available in NAD-2000. A brief description of each dataset follows.

Network Anomaly Data

The NAD-98, NAD-99, and NAD-00 data subsets contain artificial neural network based non-linear component analysis (NLCA) feature-extracted 1998, 1999, and 2000 MIT-DARPA network traffic, respectively. See G. K. Kuchimanachi, V. V. Phoha, K. S. Balagani, and S. R. Gaddam, "*Dimension Reduction Using Feature Extraction Methods for Real-time Misuse Detection Systems*," in proceedings of IEEE 2004 Information Assurance Workshop, pp. 195-202, West Point Military Academy, New York, June 2004, hereby incorporated by reference.

The 1998 MIT-DARPA datasets were collected on an evaluation test bed simulating network traffic similar to that seen between an Air Force base (the INSIDE network) and the Internet (the OUTSIDE network). See R. P. Lippman, D. J. Fried, I. Graf, J. Haines, K. Kendall, D. McClung, D. Weber, S. Webster, D. Wyschogrod, R. K. Cunningham, and M. A. Zissman, "*Evaluating intrusion detection systems: the 1998 DARPA off-line intrusion detection evaluation*," in proceedings of the DARPA Information Survivability Conference and Exposition DISCEX '00, IEEE Press, pp. 12-26, South Carolina, USA, January 2000, hereby incorporated by reference. This data set contains thirty-eight identified different attacks, launched from the OUTSIDE network. See J. Haines, L. Rossey, R. P. Lippman, and R. K. Cunningham, "*Extending the DARPA Offline Intrusion Detection Evaluation*," in proceedings of the DARPA Information Survivability Conference and Exposition, IEEE Press, California, USA, June 2001 hereby incorporated by reference).

The 1999 MIT-DARPA datasets were generated on a test bed similar to that used for 1998 MIT-DARPA datasets, and contain twenty-nine documented attacks. The 1999 datasets contain approximately three weeks of training data (with two weeks of data exclusively containing normal traffic) and two weeks of test data. Data collected in weeks 1, 3, 4 and 5 were used, excluding data from Week-2 as the list files associated with Week-2 data was not available.

The 2000 MIT-DARPA datasets are attack-scenario specific datasets. The datasets contain three attack scenarios simulated with the background traffic being similar to those in 1999 MIT-DARPA datasets. The first dataset, LLS DDOS 1.0, simulates a 3.5 hour attack scenario in which a novice attacker launches a Distributed Denial of Service (DDoS) attack against a naive adversary. The second dataset, LLS DDOS 2.0.2, is a two-hour stealthy DDoS attack scenario. The third dataset, Windows NT Attack, is a nine-hour dataset containing five phased Denial-of-Service (DoS) attack on Windows NT hosts. For the network data, data representing a network attack is considered anomalous.

The NAD-98, NAD-99, and NAD-00 datasets initially have 50 characteristics or attributes. Non-linear Component Analysis (NLCA) was undertaken to transform the 50 characteristics into a reduced set of relevant characteristics or attributes. That is, the number of characteristics in NAD-98 was reduced from 50 to 12 and the number of characteristics in NAD-99/NAD-00 was reduced from 50 to 10 using the NLCA method. For description of the NLCA method, see Gopi K. Kuchimanchi, Vir V. Phoha, Kiran S. Balagani, Shekhar R. Gaddam, *Dimension Reduction Using Feature Extraction Methods for Real-time Misuse Detection Systems*, Proceedings of the 2004 IEEE Workshop on Information Assurance and Security (June 2004).

Duffing Equation Data

The Duffing Equation Dataset (DED) was generated by Chin S. C., A. Ray, and V. Rajagopalan, "*Symbolic Time Series Analysis for Anomaly Detection: A Comparative Evaluation*," Signal Processing, vol. 85, no. 9, pages 1859-1868, September 2005., hereby incorporated by reference. See also, A. Ray, "*Symbolic Dynamic Analysis of Complex Systems for Anomaly Detection*," Signal Processing, vol. 84, no. 7, pages 1115-1130, 2004. A copy of the DED data set was provided by Penn State University. An active non-linear electronic circuit was employed to generate the data, where the circuit implements a second-order, non-autonomous, forced Duffing equation, represented as:

$$\frac{d^2 y(t)}{dt^2} + \beta(t_s)\frac{dy(t)}{dt} + y(t) + y^3(t) = A \cos \omega t \qquad (2)$$

The dissipation parameter $\beta(t_s)$, implemented as resistance in the circuit, varies in the slow-time $t_s$ and is constant in the fast time-scale t at which the dynamical system is excited. Although the system dynamics is represented by a low order differential equation, it exhibits chaotic behavior that is sufficiently complex from thermodynamic perspectives and is adequate for illustration of the anomaly detection concept. The goal is to detect changes $\beta(t_s)$, which are associated with an anomaly.

The data set represents a number of time series (each about 700 samples), where each time series is associated with a particular $\beta$, $A$, and $\omega$. We extracted data from the DED dataset representing stimulus with amplitude $A=5.5$ and $\omega=5.0$ rad/sec, and the stationary behavior of the system response for this input stimulus with $\beta=0.1$, $\beta=0.32$, $\beta=0.33$, $\beta=0.34$, and $\beta=0.35$. Each time series t(i) was partitioned into a number of subsets of four adjacent samples, that is $X(n)=\{t(i): i=4n-3, 4n-2, 4n-1, 4n\}$, each subset considered a vector of four dimensions (this partitioning was provided by Penn State). The dimensions are the attributes used in the algorithm. From this dataset of four dimensional vectors, we randomly selected 1790 instances for preparing the training data subsets and 1075 unseen random instances for preparing the test data subset. Any data where $\beta=0.1$ is considered normal, while $\beta>0.1$ is considered anomalous.

Mechanical System Data

The Mechanical System Data (MSD) was generated by A. M. Khatkhate, A. Ray, E. Keller, and S. Chin, "*Symbolic Time Series Analysis of Mechanical Systems for Anomaly Detection*," IEEE/ASME Transactions on Mechatronics, vol. 11, no. 4, pages 439-447, August 2006, hereby incorporated by reference. The data set was provided by Penn State University. The test apparatus that generated the MSD had two subsystems: (1) the plant subsystem consisting of the mechanical structure including the test specimens (i.e., the mass-beams that undergo fatigue crack damage), and related equipment (electro-magnetic shakers, and displacement measuring sensors); and (2) the instrumentation and control subsystem consisting of the hardware and software components related to data acquisition and processing. The mechanical structure of the test apparatus was persistently excited near resonance to induce a stress level that results in fatigue cracks in the mass-beam specimens and yields an average life of approximately 20,000 cycles or 36 minutes. The mass-beam attains stationary behavior in the fast-time scale of machine vibrations when persistently excited in the vicinity of its resonant frequency. Fatigue cracks occur at a slow time scale (that is, slow relative to the fast time scale dynamics of the vibratory motion). The goal is to detect the slowly evolving fatigue cracks by observing the time series data from displacement measuring sensors. There is a total of 36 minutes of data. The first two minutes of data is considered to be transient (normal) and the rest, from 3 to 36 minutes, is considered as steady state asymptotic behavior, representing anomalous data. We extracted data recorded during the $1^{st}$, $33^{rd}$, $34^{th}$, $35^{th}$, and the $36^{th}$ minute, and partitioned each minute of recorded data into subsets of four adjacent samples (as in the DED data) to produce a data set of four dimensional vectors. Each "dimension" is considered an attribute for purposes of the testing. We randomly selected 5000 instances of vectors for preparing the training data subsets and 2500 random instances for preparing the test data subset. Any data that was recorded during the $1^{st}$ minute was considered normal with the remaining data considered anomalous.

Testing

The results of using the K-Means+ID3 method with the Nearest-neighbor and Nearest-consensus combination rules are compared with the individual k-Means (alone) and ID3 decision tree methods (alone) over the NAD, DED, and MSD datasets. Seven measures for comparing the performance:

(1) TPR or recall is the percentage of anomaly instances correctly detected;
(2) FPR is the percentage of normal instances incorrectly classified as anomaly,
(3) 'precision' is the percentage of correctly detected anomaly instances over all the detected anomaly instances,
(4) 'total accuracy' or 'accuracy' is the percentage of all normal and anomaly instances that are correctly classified,
(5) the 'F-measure' is the equally-weighted (harmonic) mean of precision and recall:

$$F - \text{Measure} = \frac{2}{\frac{1}{\text{Precision}} + \frac{1}{\text{Recall}}}$$

where 'precision' is the percentage of correctly detected anomaly instances over all the detected anomaly instances and 'recall' is the percentage of anomaly instances correctly detected,
(6) the receiver operating characteristic (ROC) curve, gives the performance of an anomaly detection system by cross plotting FPR (on the x-axis) and TPR (on the y-axis), and
(7) the area under the ROC curve (AUC).

The performance measures "precision," "recall," and "F-measure" determine how the K-Means+ID3, the k-Means alone (with no ID3 undertaken) and the ID3 method alone (with no clustering) perform in identifying anomaly instances. The performance measure "accuracy" determines the number of normal and anomaly instances correctly classified by the anomaly detection methods. The measures FPR and AUC determine the number of false positives that the anomaly detection systems generate at specific detection accuracies.

In the following tests, the choice of the cluster size was based upon the results of initial runs of the k-means method on subsets of the data set with varying cluster size. Additionally, in the implementation, the K-Means+ID3 and k-Means alone method were averaged over a number of trials to de-sensitive the results from the selection of the initial cluster starting points.

Results on the NAD Datasets

FIG. 4 illustrates the performance of the k-Means, the ID3, and the K-Means+ID3 methods averaged over 10 trials for k-means and K-means+ID3. For the NAD-1998 datasets, the k value of the k-Means method was set to 20. The choice of k value used in was based on 10 trial experiments conducted with k set to 5, 10, 15, and 20. For implementation of the ID3 and K-Means+ID3 algorithm, each vector attribute or feature represented an analog value. The range of the attributes was partitioned into 45 equal width intervals, and each attribute "discretized" by binning the attribute value into the closest interval. The choice of the length of the equal-width intervals for partitioning was based on 19 experiments conducted with different partition size values (e.g. 10, 15, . . . , 100).

FIG. 4 shows that: (i) the K-Means+ID3 cascading method based on Nearest-neighbor (NN) combination rules has better performance than the k-means and ID3 in terms of TPR, FPR, Precision, and Accuracy; (ii) the TPR, FPR, Precision, Accuracy, and F-measure of the K-Means+ID3 cascading with NC combination is in-between the k-Means and the ID3; and (iii)

the K-Means+ID3 with NN combination outperforms the k-Means and ID3 algorithms in terms of F-measure, obtained from combining precision and recall.

FIG. 5 shows the ROC curves and AUC values for the k-Means, ID3 and k-Means+ID3 methods. The ROC curves for the K-Means+ID3 and the k-Means algorithms were plotted for the trials with the AUC values that are closest to the mean TPR values shown in FIG. 4. The ROC for K-Means+ID3 cascading algorithm with NN combination rule shows that the best TPR is achieved at 0.76 with an FPR as low as 0.05.

FIG. 6 illustrates the performance of the k-Means, the ID3, and the K-Means+ID3 methods averaged over 10 trials for k-Means and K-Means+ID3. For the NAD-1999 datasets, the k value of individual k-Means was set to 5. For the ID3 algorithm and K-Means+ID3, the training space was discretized into 25 equal-width intervals. FIG. 6 shows that: (i) the K-Means+ID3 cascading with NC combination has better performance than the k-Means and ID3 in terms of TPR, and (ii) precision, accuracy, and F-measure of the K-Means+ID3 with NN combination is higher than the k-Means and ID3.

FIG. 7 shows the ROC curves and AUC values of the k-Means, ID3 and K-Means+ID3 methods over NAD-1999. The ROC curves for K-Means+ID3 and k-Means method were plotted for the trial with the AUC values closest to the mean TPR values shown in FIG. 6. The K-Means+ID3 cascading with NN and NC combination has the same AUC performance as compared to k-Means and ID3 methods.

FIG. 8 illustrates the performance of the k-Means, the ID3, and the K-Means+ID3 methods averaged over 10 trials for k-Means and K-Means+ID3. For the NAD-2000 datasets, the k value of the k-Means was set to 10. For the ID3 algorithm, the training space was discretized into 15 equal-width intervals. For the K-Means+ID3 cascading algorithm, we set the value of k to 10 and partitioned the data into 15 equal-width intervals. FIG. 8 shows that: (i) the K-Means+ID3 cascading with NN combination has better performance than the k-Means and ID3 in terms of FPR and Precision, (ii) the TPR of the K-Means+ID3 cascading is less than the k-Means and ID3 methods, and (iii) the accuracy of the K-Means+ID3 is similar to the k-Means and ID3 methods.

FIG. 9 shows the ROC curves and AUC values of the k-Means, ID3 and K-Means+ID3 methods over NAD-2000 test dataset. The ROC curves for the K-Means+ID3 and k-Means methods were plotted for the trial with the AUC value that is closest to the mean TPR values in FIG. 8. The ROC curves for the k-Means, and ID3 methods show better performance than the K-Means+ID3 cascading algorithm over the NAD-2000 datasets.

Results on The DED Datasets

FIG. 10 illustrates the performance of the k-Means, the ID3, and the K-Means+ID3 methods averaged over 10 trials for k-Means and K-Means+ID3. For the DED datasets, the k value for the k-Means was set to 5 clusters. For the ID3, the training space was discretized into 45 equal-width intervals. For the K-Means+ID3 method, we set the value of k to 5 and discretized the data into 45 equal-width intervals. FIG. 10 shows that: (i) the K-Means+ID3 cascading with NC and NN combination has better performance than the k-Means in terms of FPR, precision, and accuracy, (ii) the F-measure of the K-Means+ID3 cascading is in-between the k-Means and the ID3, (iii) the TPR of the k-Means+ID3 is less than the k-Means and ID3 methods.

FIG. 11 shows the ROC curves and AUC values of the k-Means, ID3 and K-Means+ID3 methods on the DED dataset. The ROC curves for K-Means+ID3 and k-Means algorithm were plotted for the trial with the AUC value that is closest to the mean TPR values shown in FIG. 10. The ROC curve for the K-Means+ID3 cascading with NC and NN combinations is in-between the k-Means and the ID3 methods over the DED test datasets.

Results on the MSD Dataset

FIG. 12 illustrates the performance of the k-Means, the ID3, and the K-Means+ID3 algorithms averaged over 10 trials for k-Means and K-Means+ID3 on the MSD dataset. For the MSD datasets, the k value of the k-Means was set to 5. For the ID3 method, the training space was discretized into 65 equal-width intervals. For the K-Means+ID3 method, we set the value of k to 5 and discretized the data into 65 equal-width intervals. FIG. 13 shows that: (i) K-Means+ID3 with NC combination has better performance than the k-Means in terms of FPR, precision, and F-measure, and (ii) the precision, accuracy, and the F-measure of the K-Means+ID3 with NC combination is higher than the k-Means method.

FIG. 13 shows the ROC curves and AUCs of the k-Means, ID3 and K-Means+ID3 methods over MSD. The ROC curves for K-Means+ID3 and k-Means methods were plotted for the trial with the AUC value that is closest to the mean TPR values in FIG. 12. The ROC curves for the K-Means+ID3 with NN combination shows a TPR rate as high as 0.98 at a FPR of 0.4 over the MSD test dataset.

Results on the NAD, DED, and MSD datasets show that: (1) the K-Means+ID3 method outperforms the individual k-Means and the ID3 in terms of all the six performance measures over the NAD-1998 datasets; (2) the K-Means+ID3 method has a very high detection accuracy (99.12%) and AUC performance (0.96) over the NAD-1999 datasets; (3) the K-Means+ID3 method shows better FPR and precision performance as compared to the k-Means and ID3 over the NAD-2000; (4) the FPR, Precision, and the F-measure of the K-Means+ID3 is higher than the k-Means method and lower than the ID3 methods over the NAD; and (5) the K-Means+ID3 method has the highest Precision and F-measure values over the MSD.

The algorithm is robust, and required only a training set containing known anomalous data. The algorithm does not require expert input and few parameter choices. Cluster size, and attributes have to be input into the algorithm for training. After training, testing of data requires the selection of the desired thresholds and selection rule (e.g. nearest neighbor, nearest consensus, etc). The system can be used on a wide variety of any datasets reflecting normal and anomalous performance or characteristics.

For instance, the algorithm could be used on credit card purchases to detect suspected fraudulent transactions. The system may be used to model either the behavior of individual customer transactions or the behavior of overall customer transactions. The attributes to be modeled may include information such as: transaction amount, customer's average transaction amount per day, distance between transaction location and customer's home address, transaction time, and other transaction features based upon prior transaction history.

The system can be used in a variety of web based applications, for instance to recognize "killer" web pages (the page after which users leave a web site) and to assist in targeted advertising, To help diagnose diseases and patient classification, using the medical characteristics as attributes (keep in mind the ID3 attributes do not have to be real valued functions, but can be conditions such as "sunny", "overcast", "raining"). Further, the attributes employed do not have to be one dimensional; two dimensioned attributes can be used, such as images (CT images, X-rays, MRI images, etc.). Both the K-means clustering and ID3 techniques can be expanded to multiple dimensioned data. The program can be stored in a computer readable medium for execution or transportation.

We claim:

1. A computer implemented method for identifying anomalous data points in a data set $\{X(i)\}$, each data point $X(i)$ having a series of associated attributes $\{Xat(i)\}$, each associated attribute $Xat(I)$ having a value, said method using a predetermined training data set $\{T(i)\}$, each member of said training data set having a series of associated attributes $\{Tat(i)\}$, each associated attribute having a value, where a first subset of said training data set has a prior determined classification as "normal" and a second subset of said training data set has a prior determined classification as "anomalous," the method executing on a computer system having a processor, an input device and an output device, said method comprising the steps of:

(a) inputting said training data set;
(b) clustering said training data set into disjoint K-clusters using: (i) a predetermined metric and (ii) a first predetermined number of said attributes $\{Tat(i)\}$ (the "Clustering Attributes"), for each said training data set K-cluster, calculating a K-cluster center and a classification as "normal" or "anomalous," said K-cluster classification based upon the number data points in said K-cluster with a prior classification of anomalous or normal;
(c) storing each training data set K-cluster cluster center and K-cluster characterization;
(d) selecting a second predetermined number of said training set attributes (the "Decision Tree Attributes"), and inputting said Decision Tree Attributes into a prior selected ID3 algorithm, said ID3 algorithm organizing each training data set K-cluster into an associated K-Cluster ID3 decision tree having terminal nodes, non-terminal nodes and associated branches, said ID3 algorithm using said Decision Tree Attributes for each of said members in each said training data set K-cluster, so that each said non-terminal node in each respective K-Cluster ID3 decision tree represents one of said Decision Tree Attributes, and each said associated branch below each said non-terminal node represents one of said values of said Decision Tree Attributes, and each said terminal nodes of each respective K-Cluster ID3 decision tree represent a classification as "normal" or "anomalous";
(e) creating an association between each training data set K-cluster ID3 decision tree with the respective training data set K-cluster, and storing each said K-Cluster ID3 decision tree and said association;
(f) inputting a data point $X(j)$ of said data set $\{X(i)\}$ and, using the Cluster Attributes of said data point $X(j)$, selecting only one of said training data set K-clusters (the "Selected Cluster");
(g) recalling said stored associated ID3 K-cluster decision tree of said Selected Cluster, and characterizing said $X(j)$ data point as "anomalous" or "normal" based on said Decision Tree Attributes values of said data point $X(j)$; and
(h) outputting said characterization.

2. The computer implemented method of claim 1 wherein said step (f) of selecting only one of said training data sets K-cluster with said data point $X(j)$ comprises the step of, using said predetermined metric and said Clustering Attributes, calculating the distance of said data point $X(j)$ from each said K-cluster centers, and said selected K-cluster is that K-cluster having a minimum distance to said data point $X(j)$.

3. The computer implemented method of claim 1 wherein the Selected Cluster is selected by calculating the distance, using said metric and said Cluster Attributes values of said data point $X(j)$, of said data point $X(j)$ from each of said training data set K-clusters centers and select that training data set K-Cluster having a minimum distance to said data point $X(j)$.

4. A computer implemented method for identifying anomalous data points in a data set $\{X(i)\}$, each data point $X(i)$ having a series of associated attributes $\{Xat(i)\}$, each associated attribute $Xat(I)$ having a value, said method using a predetermined training data set $\{T(i)\}$, each member of said training data set having a series of associated attributes $\{Tat(i)\}$, each associated attribute having a value, where a first subset of said training data set has a prior determined classification as "normal" and a second subset of said training data set has a prior determined classification as "anomalous," the method executing on a computer system having a processor, an input device and an output device, said method comprising the steps of:

(a) inputting said training data set;
(b) clustering said training data set into disjoint K-clusters using: (i) a predetermined metric and (ii) a first predetermined number of said attributes $\{Tat(i)\}$ (the "Clustering Attributes"), for each said training data set K-cluster, calculating a K-cluster center and a classification as "normal" or "anomalous," said K-cluster classification based upon the number data points in said K-cluster with a prior classification of anomalous or normal;
(c) storing each training data set K-cluster cluster center and K-cluster characterization;
(d) selecting a second predetermined number of said training set attributes (the "Decision Tree Attributes"), and inputting said Decision Tree Attributes into a prior selected ID3 algorithm, said ID3 algorithm organizing each training data set K-cluster into an associated K-Cluster ID3 decision tree having terminal nodes, non-terminal nodes and associated branches, said ID3 algorithm using said Decision Tree Attributes in each said training data set K-cluster, so that each said non-terminal node in each respective K-Cluster ID3 decision tree represents one of said Decision Tree Attributes, and each said associated branch below each said non-terminal node represents one of said values of said Decision Tree Attributes, and each said terminal nodes of each respective K-Cluster ID3 decision tree represent a classification as "normal" or "anomalous";
(e) creating an association between each training data set K-cluster ID3 decision tree with the respective training data set K-cluster, and storing each said K-Cluster ID3 decision tree and said association;
(f) inputting a data point $X(j)$ of said data set $\{X(i);\}$
(g) using said metric and said Cluster Attributes, calculate the distance between said data point $X(j)$, and each of said training data set K-clusters, and selecting a predetermined number L of said training data set K-clusters, where said L selected training data set K-clusters represents the L smallest distances between said data point $X(j)$ and said training data set K-clusters;
(h) for each selected training data set K-cluster, characterize said data point $X(j)$ as "anomalous" or "normal", said characterization, based on said Decision Tree Attribute values of said data point $X(j)$, determined by each said selected K-cluster ID3 decision tree;

(i) identify a subset of said selected training data set K-clusters as those training data set K-clusters having said cluster characterization agree with said associated K-Cluster ID3 characterization for the data point X(j)

(j) of said subset of said selected training data set K-clusters, identify the training data set K-cluster having the minimum distance to said data point X(j); and (k) output the characterization of said training data set K-cluster identified in step (j).

5. The computer implemented method of claim 4 wherein the characterization of each of said training data set K-clusters as either "normal" or "anomalous" is determined by the characterization of the majority of the training data set members {T(i)} within the respective training data set K-cluster.

6. The computer implemented method of claim 4 further including a predetermined percent threshold, and wherein the characterization of each of said training data set K-clusters further includes the steps of for each training data set K-Cluster, determine the percentage of said training data set points in said training data set K-cluster with a characterization as "anomalous", and assigning a K-cluster characterization of "anomalous" if said percentage exceeds said predetermined percent threshold, otherwise assigning the characterization as "normal".

7. The computer implemented method of claim 4 wherein said each said training data set K-cluster center comprises a centroid computed from said Cluster Attribute values, and said step (g) of calculating the distances between said data point X(j) and each of said training data set K-clusters further comprises the steps of determining the distance, using said predetermined metric, between said Cluster Attribute values of said data point X(j), and said centroids.

8. The computer implemented method of claim 4 wherein certain Decision Tree attributes of said {Tat(i)} and {Xat(i)} are continuous valued, and said method further comprises the step the replacing each of said continuous values with a discrete value.

9. The computer implemented method of claim 8 wherein said step of replacing said continuous values with a discrete valve comprises the steps of: (1) partitioning the range of each said continuous values into a disjoint finite set {r(i)} of portions of said range, and (2) for each of said portion r(i) of said range, assigning a representative value ra(I) within said portion of said range as the discrete valve for said portion; and (3) for each continuous valued attribute, replacing the value of said continuous valued attribute with a selected one of said ra(I).

10. The computer implemented method of claim 9 wherein step (3) further comprises the step of identifying the portion r(k) of the range that said value of said continuous valued attribute falls within, and replacing the value of said continuous valued attribute with a the value ra(K) that represents a value within the portion r(k).

11. A computer implemented method for identifying anomalous data points in a data set {X(i)}, each data point X(i) having a series of associated attributes {Xat(i)}, each associated attribute Xat(I) having values, said method using a predetermined training data set {T(i)}, each member of said training data set having a series of associated attributes {Tat (i)}, each associated attribute having a value, where a first subset of said training data set has a prior determined classification as "normal" and a second subset of said training data set has a prior determined classification as "anomalous," the method executing on a computer system having a processor, an input device and an output device, said method comprising the steps of:

(a) inputting said training data set;

(b) clustering said training data set into disjoint K-cluster, K being predetermined, using: (i) a predetermined metric and (ii) a first predetermined number of said attributes {Tat(i)} (the "Clustering Attributes"), for each said training data set K-cluster, calculating a K-cluster center and a classification as "normal" or "anomalous," said K-cluster classification based upon the number data points in said K-cluster with a prior classification of anomalous or normal;

(c) storing each training data set K-cluster cluster center and K-cluster characterization;

(d) for each said K-cluster, assigning a probability to said K-cluster representative of the anomalous data occurrences or the normal data occurrences in said K-cluster, and storing said K-cluster probability;

(e) selecting a second predetermined number of said training set attributes (the "Decision Tree Attributes"), and inputting said Decision Tree Attributes into a prior selected ID3 algorithm, said ID3 algorithm organizing each training data set K-cluster into an associated K-Cluster ID3 decision tree having terminal nodes, non-terminal nodes and associated branches, said ID3 algorithm using said Decision Tree Attributes for each of said members in each said training data set K-cluster, so that each said non-terminal node in each respective K-Cluster ID3 decision tree represents one of said Decision Tree Attributes, and each said associated branch below each said non-terminal node represents one of said values of said Decision Tree Attributes, and each said terminal nodes of each respective K-Cluster ID3 decision tree represent a classification as "normal" or "anomalous";

(f) input a data point X(j) from said set {X(i)}

(g) using said predetermined metric and said Cluster Attributes values of said data point X(j), calculate the distance between said data point X(j) and each of said training data set K-cluster centers;

(h) selecting a predetermined number L of said training data set K-clusters, where said selected training data set K-clusters are those L training data set K-clusters with the smallest distances calculated in step (g);

(i) for each said selected training data set K-clusters, retrieving said stored K-Cluster probability and scale each probability with a factor dependent upon the distance between said data point X(j) and said selected training data set K-cluster; and for that training data set K-Cluster, assign a K-cluster characterization as "anomalous" or "normal" to said data point based upon said scaled probability;

(j) storing said selected training data set K-Cluster characterizations for said data point X(j);

(k) for each selected training data set K-cluster, based on said Decision Tree Attribute values of said data point X(j), characterize said data point X(j) as "anomalous" or "normal";

(l) identify a subset of said selected training data set K-clusters as those training data set K-clusters having said cluster characterization in agreement with said associated K-Cluster ID3 characterization for the data point X(j), (m) of said subset of said selected training data set K-clusters, identify the training data set K-cluster having the minimum distance to said data point X(j); and (n) output the characterization of said training data set K-cluster identified in step (m).

12. A computer readable medium having encoded thereon a series of computer implemented instructions, such that when executed on a computer, having
 (i) computer processor means for processing data;
 (ii) storage means for storing data on a storage medium;
 (iii) first means for initializing the storage medium;
 (iv) second means for processing data regarding a training set of data,
 the computer performs the steps of
 (a) inputting a predetermined training data set; {T(i)}, each member of said training data set having a series of associated attributes {Tat(i)}, each associated attribute having a value, where a first subset of said training data set has a prior determined classification as "normal" and a second subset of said training data set has a prior determined classification as "anomalous,
 (b) clustering said training data set into disjoint K-clusters using: (i) a predetermined metric and (ii) a first predetermined number of said attributes {Tat(i)} (the "Clustering Attributes"), for each said training data set K-cluster, calculating a K-cluster center and a classification as "normal" or "anomalous," said K-cluster classification based upon the number data points in said K-cluster with a prior classification of anomalous or normal;
 (c) storing each training data set K-cluster cluster center and K-cluster characterization;
 (d) selecting a second predetermined number of said training set attributes (the "Decision Tree Attributes"), and inputting said Decision Tree Attributes into a prior selected ID3 algorithm, said ID3 algorithm organizing each training data set K-cluster into an associated K-Cluster ID3 decision tree having terminal nodes, non-terminal nodes and associated branches, said ID3 algorithm using said Decision Tree Attributes for each of said members in each said training data set K-cluster, so that each said non-terminal node in each respective K-Cluster ID3 decision tree represents one of said Decision Tree Attributes, and each said associated branch below each said non-terminal node represents one of said values of said Decision Tree Attributes, and each said terminal nodes of each respective K-Cluster ID3 decision tree represent a classification as "normal" or "anomalous";
 (e) creating an association between each training data set K-cluster ID3 decision tree with the respective training data set K-cluster, and storing each said K-Cluster ID3 decision tree and said association;
 (f) inputting a data point X(j) from a data set {X(i)}, each data point X(i) having a series of associated attributes {Xat(i)}, each associated attribute Xat(I) having a value,
 (g) using the Cluster Attributes of said data point X(j), selecting only one of said training data set K-clusters (the "Selected Cluster");
 (h) recalling said stored associated ID3 K-cluster decision tree of said Selected Cluster, and characterizing said X(j) data point as "anomalous" or "normal" based on said Decision Tree Attributes values of said data point X(j); and
 (i) outputting said characterization.

13. A tangible computer readable medium having encoded thereon a series of computer implemented instruction, such that when executed on a computer comprising
 (i) computer processor means for processing data;
 (ii) storage means for storing data on a storage medium;
 (iii) first means for initializing the storage medium;
 (iv) second means for processing data regarding a training set of data;
 Implement a method for identifying anomalous data points in a data set {X(i)}, each data point X(i) having a series of associated attributes {Xat(i)}, each associated attribute Xat(I) having a value, said method using a predetermined training data set {T(i)}, each member of said training data set having a series of associated attributes {Tat(i)}, each associated attribute having a value, where a first subset of said training data set has a prior determined classification as "normal" and a second subset of said training data set has a prior determined classification as "anomalous," the method executing on a computer system having a processor, an input device and an output device, said method comprising the steps of:
 (i) inputting said training data set;
 (j) clustering said training data set into disjoint K-clusters using: (i) a predetermined metric and (ii) a first predetermined number of said attributes {Tat(i)} (the "Clustering Attributes"), for each said training data set K-cluster, calculating a K-cluster center and a classification as "normal" or "anomalous," said K-cluster classification based upon the number data points in said K-cluster with a prior classification of anomalous or normal;
 (k) storing each training data set K-cluster cluster center and K-cluster characterization;
 (l) selecting a second predetermined number of said training set attributes (the "Decision Tree Attributes"), and inputting said Decision Tree Attributes into a prior selected ID3 algorithm, said ID3 algorithm organizing each training data set K-cluster into an associated K-Cluster ID3 decision tree having terminal nodes, non-terminal nodes and associated branches, said ID3 algorithm using said Decision Tree Attributes for each of said members in each said training data set K-cluster, so that each said non-terminal node in each respective K-Cluster ID3 decision tree represents one of said Decision Tree Attributes, and each said associated branch below each said non-terminal node represents one of said values of said Decision Tree Attributes, and each said terminal nodes of each respective K-Cluster ID3 decision tree represent a classification as "normal" or "anomalous";
 (m) creating an association between each training data set K-cluster ID3 decision tree with the respective training data set K-cluster, and storing each said K-Cluster ID3 decision tree and said association;
 (n) inputting a data point X(j) of said data set {X(i)} and, using the Cluster Attributes of said data point X(j), selecting only one of said training data set K-clusters (the "Selected Cluster");
 (o) recalling said stored associated ID3 K-cluster decision tree of said Selected Cluster, and characterizing said X(j) data point as "anomalous" or "normal" based on said Decision Tree Attributes values of said data point X(j); and
 (p) outputting said characterization.

* * * * *